(12) United States Patent
Austrheim

(10) Patent No.: US 12,378,070 B2
(45) Date of Patent: *Aug. 5, 2025

(54) STORAGE SYSTEM

(71) Applicant: Autostore Technology AS, Nedre Vats (NO)

(72) Inventor: Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 0 days.

This patent is subject to a terminal disclaimer.

(21) Appl. No.: 18/632,001

(22) Filed: Apr. 10, 2024

(65) Prior Publication Data
US 2024/0253901 A1      Aug. 1, 2024

Related U.S. Application Data

(63) Continuation of application No. 17/600,963, filed as application No. PCT/EP2020/055864 on Mar. 5, 2020, now Pat. No. 11,981,505.

(30) Foreign Application Priority Data

Apr. 2, 2019   (NO) .................................... 20190446

(51) Int. Cl.
*B65G 1/04*         (2006.01)
*B65G 1/137*        (2006.01)

(52) U.S. Cl.
CPC ......... *B65G 1/0464* (2013.01); *B65G 1/1378* (2013.01); *B65G 2201/0235* (2013.01)

(58) Field of Classification Search
CPC .................................................. B65G 1/0457
See application file for complete search history.

(56) References Cited

U.S. PATENT DOCUMENTS 4,088,232 A    5/1978  Lilly
11,208,265 B2 * 12/2021  Fjeldheim ............ B65G 1/0464
(Continued)

FOREIGN PATENT DOCUMENTS

CN    103879789 A    6/2014
FR    2 178 786 A1   11/1973
(Continued)

OTHER PUBLICATIONS

Search Report in counterpart Norwegian Patent Application No. 20190446 issued on Nov. 1, 2019 (2 pages).
(Continued)

*Primary Examiner* — Kaitlin S Joerger
(74) *Attorney, Agent, or Firm* — Baker Botts L.L.P.

(57) ABSTRACT

A container lift for a container storage and retrieval system includes a lifting assembly. The lifting assembly is suspended from one or more lifting elements and is arranged to be raised or lowered in order to raise or lower an accompanying storage container within the storage and retrieval system. The lifting assembly includes a lifting frame part for releasable attachment to a storage container, and a guide shuttle arranged to guide the lifting frame part and any accompanying storage container as the lifting frame part is raised and lowered within the storage and retrieval system. The guide shuttle includes guide elements which are each arranged to interact with a corresponding guide surface of the storage and retrieval system to stabilise and maintain horizontal alignment of the lifting frame part and any accompanying storage container during the raising and lowering of the lifting frame part.

12 Claims, 26 Drawing Sheets

(56) References Cited

U.S. PATENT DOCUMENTS

| | | | |
|---|---|---|---|
| 2018/0257860 A1 | 9/2018 | Hognaland et al. | |
| 2018/0370725 A1* | 12/2018 | Hognaland | B65G 1/0457 |
| 2020/0216263 A1 | 7/2020 | Fjeldheim et al. | |
| 2021/0086782 A1* | 3/2021 | Austrheim | G05D 1/0011 |
| 2021/0114808 A1* | 4/2021 | Austrheim | B65G 1/0464 |
| 2021/0139239 A1* | 5/2021 | Austrheim | B65G 1/0464 |
| 2021/0147201 A1* | 5/2021 | Austrheim | B66C 11/12 |
| 2022/0194702 A1* | 6/2022 | Austrheim | B65G 1/1378 |

FOREIGN PATENT DOCUMENTS

| | | |
|---|---|---|
| NO | 317366 B1 | 10/2004 |
| WO | 2005/030618 A1 | 4/2005 |
| WO | 2014075937 A1 | 5/2014 |
| WO | 2014090684 A1 | 6/2014 |
| WO | 2015/140216 A1 | 9/2015 |
| WO | 2015193278 A1 | 12/2015 |
| WO | 2016/198467 A1 | 12/2016 |
| WO | 2017/129384 A1 | 8/2017 |
| WO | 2019057442 A1 | 3/2019 |

OTHER PUBLICATIONS

International Search Report for corresponding International Application No. PCT/EP2020/055864, mailed Jun. 18, 2020 (4 pages).
Writen Opinion for corresponding International Application No. PCT/EP2020/055864, mailed Jun. 18, 2020 (10 pages).
Office Action issued in Chinese Application No. 2020800275417 mailed on Sep. 1, 2022 (9 pages).

* cited by examiner

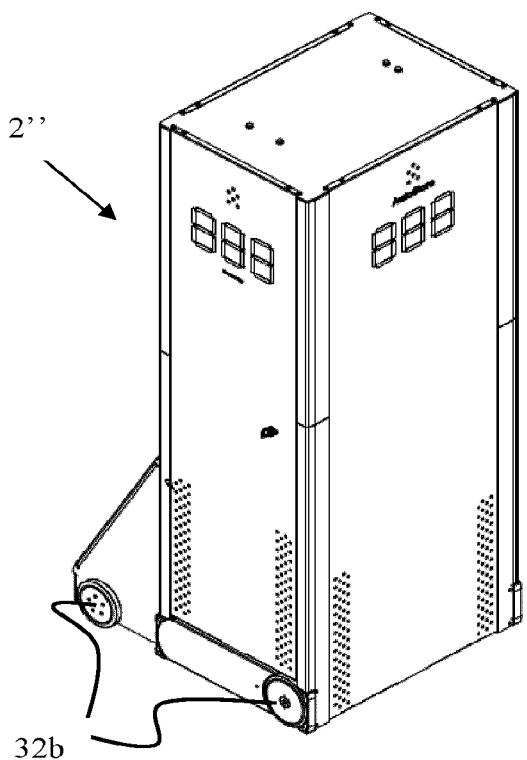
Fig. 25A
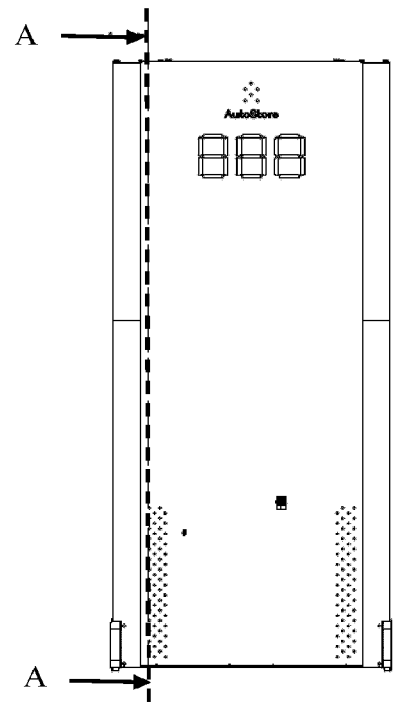
Fig. 25B
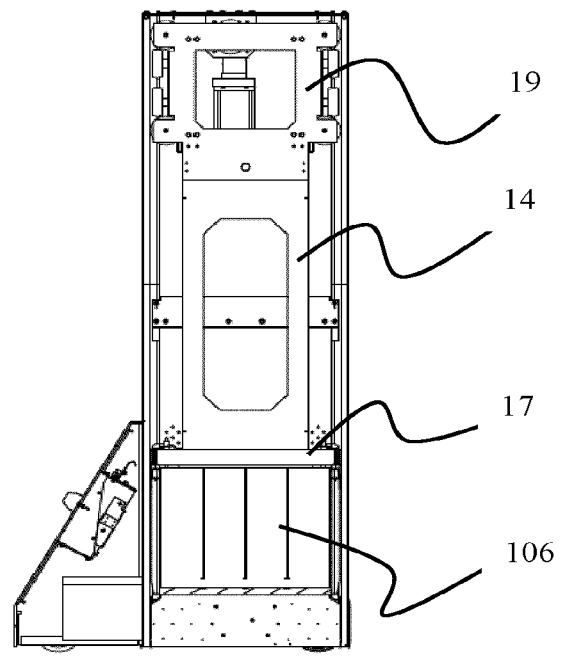
Fig. 25C (A-A)

STORAGE SYSTEM

TECHNICAL FIELD

The present invention relates to an automated storage system, a container lift vehicle for use in such storage systems, as well as methods for use of the storage system.

BACKGROUND

FIGS. 1A and 2B disclose a typical prior art automated storage and retrieval system 1 with a framework structure 100. FIGS. 1B and 2B disclose prior art container handling vehicles 200,300 operating in the system 1 disclosed in FIGS. 1A and 2A, respectively.

The framework structure 100 defines a storage grid 104 comprising a plurality of upright members 102 and optionally a plurality of horizontal members 103 supporting the upright members 102. The members 102, 103 may typically be made of metal, e.g. extruded aluminium profiles.

The storage grid 104 comprises multiple grid columns 112. A large majority of the grid columns are also termed storage columns 105, in which storage containers 106, also known as bins, are stacked one on top of another to form stacks 107.

Each storage container 106 may typically hold a plurality of product items (not shown), and the product items within a storage container 106 may be identical or may be of different product types depending on the application.

The grid columns 112 of the storage grid 104 guard against horizontal movement of the of storage containers 106 in the stacks 107, and guides vertical movement of the containers 106, but does normally not otherwise support the storage containers 106 when stacked. A cross-sectional view of an upright member 102 of the storage grid 104 is shown in FIG. 3. The upright member 102 comprises vertical guide surfaces 116 (or vertical guide plates) for guiding a storage container being moved inside a grid column 112. In a grid column, each of the four upright members 102 provides an inside corner 117 for guiding a corresponding corner of a storage container 106, see FIG. 4 showing the cross-section of a grid column 112 and the schematic circumference of a storage container 106. Typically, each upright member features eight vertical guide surfaces 116 and may thus provide an inside corner 117 of four separate grid columns 112 of the storage grid 104.

The automated storage and retrieval system 1 comprises a rail system 108 (or a top rail grid) arranged in a grid pattern across the top of the storage grid 104, on which rail system 108 a plurality of container handling vehicles 200,300 (as exemplified in FIGS. 1B and 2B) are operated to raise storage containers 106 from, and lower storage containers 106 into, the storage columns 105, and also to transport the storage containers 106 above the storage columns 105. The horizontal extent of one of the grid cells 122 constituting the grid pattern is in FIGS. 1A and 2A marked by thick lines.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122 due to the horizontal extent of the rails 110,111.

The rail system 108 comprises a first set of parallel rails 110 arranged to guide movement of the container handling vehicles 200,300 in a first direction X across the top of the frame structure 100, and a second set of parallel rails 111 arranged perpendicular to the first set of rails 110 to guide movement of the container handling vehicles 200,300 in a second direction Y which is perpendicular to the first direction X. In this way, the rail system 108 defines the upper ends of the grid columns 112 above which the container handling vehicles 200,300 can move laterally, i.e. in a plane which is parallel to the horizontal X-Y plane. Commonly, at least one of the sets of rails 110,111 is made up of dual-track rails allowing two container handling vehicles to pass each other on neighbouring grid cells 122. Dual-track rails are well-known and disclosed in for instance WO 2015/193278 A1 and WO 2015/140216 A1, the contents of which are incorporated herein by reference.

Each prior art container handling vehicle 200,300 comprises a vehicle body and a wheel arrangement of eight wheels 201,301, wherein a first set of four wheels 32a enable the lateral movement of the container handling vehicles 200,300 in the X direction and a second set of four wheels 32b enable the lateral movement in the Y direction. One or both sets of wheels in the wheel arrangement can be lifted and lowered, so that the first set of wheels and/or the second set of wheels can be engaged with the respective set of rails 110, 111 at any one time.

Each prior art container handling vehicle 200,300 also comprises a lifting device 18 (only shown in FIG. 2B) for vertical transportation of storage containers 106, e.g. raising a storage container 106 from, and lowering a storage container 106 into, a grid column 112. The lifting device 18 comprises four metal lifting bands 16 extending in a vertical direction and connected close to the corners of a lifting frame 17 (may also be termed a gripping device) such that the lifting frame is kept horizontal. The lifting frame 17 features container connecting elements 24 for releasable connection to a storage container, and guiding pins 30. The lateral movement of the lifting frame 17 is restricted by the upright members 102 defining a grid column 112 when the lifting frame 17 moves vertically within the column.

To raise or lower the lifting frame 17 (and optionally a connected storage container 6), the lifting bands 16 are connected to a band drive assembly (not shown). In the band drive assembly, the lifting bands 16 are commonly spooled on/off at least two rotating lifting shafts or reels arranged in the container-handling vehicle, wherein the lifting shafts are further connected via belts/chains to at least one common rotor shaft providing synchronized rotational movement to the at least two lifting shafts. Various designs of the lifting shafts are described in for instance WO2015/193278 A1 and PCT/EP2017/050195. Since the lifting bands 16 are spooled off/on a shaft or reel when the lifting frame 17 is lowered/lifted, minor variations in the thickness of the lifting bands 16 will cause corresponding differences in the distance between the shaft/reel and each corner of the lifting frame 16. Such minor variations in the thickness are unavoidable, and the subsequent differences in the distance between the shaft/reel and each corner of the lifting frame will increase when the length of the lifting bands, and consequently the maximum lifting height of the lifting device, is increased. When the differences in the distance between the shaft/reel and each corner of the lifting frame 17 increases, the possible tilt of the lifting frame will also increase. During vertical movement within a grid column 112, the lifting frame 17 must be kept substantially horizontal to avoid having the lifting frame and/or a connected storage container from becoming stuck within the column. Consequently, the useful lifting height of the lifting device is restricted due to the requirement of keeping the lifting frame substantially horizontal when used to transfer a storage container 106 inside a grid column 112. The useful lifting height of the prior art container handling vehicles 200,300 is commonly about 6 meters, which corresponds to the height of the prior art storage grids 104.

Conventionally, and also for the purpose of this application, Z=1 identifies the uppermost layer of the storage grid 104, i.e. the layer immediately below the rail system 108, Z=2 the second layer below the rail system 108, Z=3 the third layer etc. In the prior art storage grid disclosed in FIGS. 1A and 2A, Z=8 identifies the lowermost, bottom layer of the storage grid 104. Consequently, as an example, and using the Cartesian coordinate system X, Y, Z indicated in FIGS. 1A and 2B, the storage container identified as 106' in FIG. 1 can be said to occupy grid location or cell X=10, Y=2, Z=3. The container handling vehicles 200,300 can be said to travel in layer Z=0 and each grid column can be identified by its X and Y coordinates.

Each container handling vehicle 200 comprises a storage compartment or space (not shown) for receiving and stowing a storage container 106 when transporting the storage container 106 across the top of the storage grid 104. The storage space may comprise a cavity arranged centrally within the vehicle body, e.g. as is described in WO2014/090684A1, the contents of which are incorporated herein by reference.

Alternatively, the container handling vehicles 300 may have a cantilever construction as described in NO317366, the contents of which are also incorporated herein by reference.

The container handling vehicles 200 may have a footprint, i.e. an extent in the X and Y directions, which is generally equal to the horizontal area of a grid cell 122, i.e. the extent of a grid cell 122 in the X and Y directions, e.g. as is described in WO2015/193278A1, the contents of which are incorporated herein by reference.

Alternatively, the container handling vehicles 200 may have a footprint which is larger than the horizontal area of a grid cell 122, e.g. as is disclosed in WO2014/090684A1.

In a storage grid 104, most of the grid columns 112 are storage columns 105, i.e. grid columns wherein storage containers 106 are stored in stacks 107. However, a storage grid 104 normally has at least one grid column 112 which is not used for storing storage containers 106, but is arranged at a location wherein the container handling vehicles 200, 300 can drop off and/or pick up storage containers 106 so that they can be transported to a second location (not shown) where the storage containers 106 can be accessed from outside of the storage grid 104 or transferred out of or into the grid 104. Within the art, such a location is normally referred to as a "port" and the grid column 112 at which the port is located may be referred to as a transfer column 119,120. The drop-off and pick-up ports are the upper ends/openings of a respective transfer column 119,120.

The prior art storage grids 104 in FIGS. 1A and 2A comprise two transfer columns 119 and 120. The first transfer column 119 may for example comprise a dedicated drop-off port where the container handling vehicles 200,300 can drop off storage containers 106 to be transported through the transfer column 119 and further to e.g. a picking/stocking station, and the second transfer column 120 may comprise a dedicated pick-up port where the container handling vehicles 200,300 can pick up storage containers 106 that have been transported through the transfer column 120 from e.g. a picking/stocking station. A storage container may be transported through a transfer column by use of the lifting device of a container handling vehicle 200,300 or by use of a storage container lift arranged in the transfer column. Each of the ports of the first and second transfer column may be suitable for both pick-up and drop-off of storage containers.

The second location may typically be a picking/stocking station, wherein product items are removed from and/or positioned into the storage containers 106. In a picking/stocking station, the storage containers 106 are normally never removed from the automated storage and retrieval system 1 but are returned into the storage grid 104 once accessed.

For monitoring and controlling the automated storage and retrieval system 1, e.g. monitoring and controlling the location of respective storage containers 106 within the storage grid 104; the content of each storage container 106; and the movement of the container handling vehicles 200,300 so that a desired storage container 106 can be delivered to the desired location at the desired time without the container handling vehicles 200,300 colliding with each other, the automated storage and retrieval system 1 comprises a computerized control system (not shown) which typically comprises a database for keeping track of the storage containers 106.

A conveyor system comprising conveyor belts or rollers is commonly employed to transport the storage containers from a lower end of the transfer columns 119,120 to e.g. a picking/stocking station.

A conveyor system may also be arranged to transfer storage containers between different storage grids, e.g. as is described in WO2014/075937A1, the contents of which are incorporated herein by reference.

Further, WO2016/198467A1, the contents of which are incorporated herein by reference, discloses an example of a prior art access system having conveyor belts (FIGS. 5a and 5b in WO2016/198467A1) and a frame mounted rail (FIGS. 6a and 6b in WO2016/198467A1) for transporting storage containers between transfer columns and stations where operators can access the storage containers.

When a storage container 106 stored in the storage grid 104 disclosed in FIG. 1A is to be accessed, one of the container handling vehicles 200,300 is instructed to retrieve the target storage container 106 from its position in the storage grid 104 and transport it to or through the transfer column 119. This operation involves moving the container handling vehicle 200,300 to a grid location above the storage column 105 in which the target storage container 106 is positioned, retrieving the storage container 106 from the storage column 105 using the container handling vehicle's lifting device (not shown), and transporting the storage container 106 to the transfer column 119. If the target storage container 106 is located deep within a stack 107, i.e. with one or a plurality of other storage containers positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle 200,300 that is subsequently used for transporting the target storage container 106 to the transfer column, or with one or a plurality of other cooperating container handling vehicles 200,300. Alternatively, or in addition, the automated storage and retrieval system 1 may have container handling vehicles 200,300 specifically dedicated to the task of temporarily removing storage containers 106 from a storage column 105. Once the target storage container 106 has been removed from the storage column 105, the temporarily removed storage containers can be repositioned into the original storage column 105. However, the removed storage containers may alternatively be relocated to other storage columns 105.

When a storage container 106 is to be stored in the grid 104, one of the container handling vehicles 200,300 is instructed to pick up the storage container 106 from the transfer column 120 and to transport it to a grid location above the storage column 105 where it is to be stored. After any storage containers positioned at or above the target position within the storage column stack 107 have been removed, the container handling vehicle 200,300 positions the storage container 106 at the desired position. The removed storage containers may then be lowered back into the storage column 105 or relocated to other storage columns 105.

WO 2014/075937 A1 discloses a prior art storage system comprising two separate storage grids 104',104" arranged vertically above each other, see FIG. 5. Each storage grid is arranged on an intermediate floor 80',80" (i.e. a mezzanine). The two storage grids and a plurality of picking/stocking stations 109 are interconnected by storage container lifts 50 arranged to transport a storage container between the storage grids and/or between any of the storage grids and a picking/stocking station. The container handling vehicles 300 arranged at the top rail grids 108',108" of the storage grids comprises a lifting device 18 which is unable to lift or lower a storage container over a vertical distance larger than the height of a single storage grid, see description above. The lifting devices 18 of the container handling vehicles 300 are not able to lift/lower a storage container 106 a vertical distance exceeding the height of a single storage grid which is about 6 m. Thus, the storage container lifts 50 are a requirement in these prior art systems to allow transport of a storage container 106 between the two storage grids 104',104" or between a storage grid 104' and one of the picking/stocking stations 109.

The major components of a prior art storage container lift 50 are shown in FIG. 6. The storage container lift features two parallel and vertical guide members 51, each featuring a guide track 52, and a storage container shuttle 53. The storage container shuttle 53 features two support arms 54 upon which a storage container 106 may be arranged and a vertical guide frame 55 featuring guide wheels 56 arranged in the corresponding guide tracks of the guide members 51. The storage container shuttle may be moved vertically by appropriate lifting means not disclosed. The storage container lift is arranged within a grid column 112. The available horizontal area within a grid column (i.e. the area not occupied by a storage container) is minimal, see FIG. 6, and the requirement of arranging the vertical guide members within or between the grid columns means that the margin for errors in movement of the storage container shuttle is very low.

In view of the above, the aim of the present invention is to provide an automated storage and retrieval system, and a method for operating such a system, that solves or at least mitigates one or more of the aforementioned problems related to the use of prior art storage and retrieval systems.

SUMMARY

The present invention is defined by the attached claims and in the following:

In a first aspect, the present invention provides a storage system comprising at least one storage grid and a container lift, the storage grid comprises vertical column profiles defining a plurality of grid columns, the grid columns comprise storage columns, in which storage containers can be stored one on top of another in vertical stacks, and at least one transfer column, each of the grid columns being defined by four vertically extending column profiles, and the column profiles are interconnected at their upper ends by top rails forming a horizontal top rail grid of the storage grid, wherein the container lift comprises a lifting assembly which is suspended from one or more spoolable lifting elements and arranged to be raised or lowered in order to raise or lower an accompanying storage container within the storage grid, wherein the lifting assembly comprises a lifting frame part for releasable attachment to an upper section of a storage container and a guide shuttle arranged to guide the lifting frame part and any accompanying storage container as the lifting frame part is raised and lowered within the storage grid, the guide shuttle is arranged above the lifting frame part and comprises guide elements which are each arranged to interact with one of the four column profiles of a grid column to stabilise and maintain horizontal alignment of the lifting frame part and any accompanying storage container during the raising and/or lowering of the lifting frame part; and a framework featuring internal guide surfaces arranged to interact with the guide elements of the guide shuttle when the guide shuttle is at a level above the top rail grid, such that the horizontal alignment of the lifting frame part is stabilised and maintained.

In other words, the internal guide surfaces are arranged to interact with the guide elements of the guide shuttle such that horizontal misalignment of the lifting frame part is restricted.

In other words, each of the guide elements is arranged to interact with one of the four column profiles of a grid column to limit and/or restrict horizontal misalignment of the lifting frame part and any accompanying storage container during the raising and/or lowering of the lifting frame part.

Moreover, each of the guide elements is arranged to interact with one of the four column profiles of a grid column to restrict tilting of the lifting frame part and any accompanying storage container, relative a horizontal plane, during the raising and/or lowering of the lifting frame part.

In an embodiment of the storage system, the container lift may move in at least one lateral direction relative to the top rail grid.

In an embodiment of the storage system, the container lift may move in two perpendicular lateral directions relative to the top rail grid.

In an embodiment of the storage system, the spoolable lifting elements may be selected from any suitable type of lifting band or wire.

In an embodiment of the storage system, the guide elements comprise sliding devices, roller assemblies or any combination thereof.

In an embodiment of the storage system, each column profile of a grid column comprises two vertical guide surfaces forming an inside corner of the grid column, and each guide element is arranged to interact with at least one of the vertical guide surfaces of a corresponding inner corner of a grid column in which the lifting assembly is moved.

In an embodiment of the storage system, each guide element may comprise a sliding or rotatable surface arranged to interact with at least one of the vertical guide surfaces of a corresponding inner corner of a grid column in which the lifting assembly is moved.

In an embodiment of the storage system, the guide elements are arranged to interact with all the vertical guide surfaces of a grid column in which the lifting assembly is moved.

In an embodiment of the storage system, the guide elements are arranged such that all the vertical guide surfaces of a grid column in which the lifting assembly is moved will interact with a guide element.

In an embodiment of the storage system, at least one of the guide elements comprises a roller assembly having at least one rotatable circumference arranged to interact with a corresponding vertical guide surface of a grid column in which the lifting assembly is moved.

In an embodiment of the storage system, the roller assembly comprises at least one rotatable circumference arranged to interact with the vertical guide surfaces of a corresponding inside corner of a grid column in which the lifting frame part is moved.

In other words, the roller assembly may comprise at least one rotatable surface.

In an embodiment of the storage system, the guide shuttle comprises four vertically extended corner sections, wherein at least one guide element is arranged at each corner section. The at least one guide element may comprise two or more vertically separate contact points or a vertically extended contact area, wherein the vertical separation of the contact points or the extension of the contact area is sufficient to restrict the tilt of the lifting frame part relative a horizontal plane.

The contact points or the contact area may be a sliding or rotatable surface.

In an embodiment of the storage system, the guide elements are arranged to interact with all the vertical guide surfaces of a grid column (i.e. all of eight vertical guide surfaces) in which the lifting assembly is moved.

In an embodiment of the storage system, each of the guide elements may comprise two vertically separate contact points or a vertically extended contact area, wherein the vertical separation or extent is sufficient to restrict the tilt of the lifting frame relative a horizontal plane. The vertical separation of the contact points, or the vertical extent of the contact area, may be at least 25 times, at least 50 times or at least 100 times the horizontal distance between the contact points, or the contact area, and a corresponding vertical guide surface or inner guide surface, or a corresponding internal guide surface of the container lift.

In an embodiment of the storage system, the vertical separation of the contact points, or the vertical extent of the contact area, may be at least 25% or at least 50% of the width of the lifting frame part.

In an embodiment of the storage system, the container lift is a container lift vehicle comprising a vehicle body, into which a storage container may be lifted by the lifting assembly, and at least one set of wheels for moving the container lift vehicle in a horizontal direction on the top rail grid.

In an embodiment of the storage system, the vehicle body of the container lift vehicle comprises a framework featuring internal guide surfaces arranged to interact with the guide elements of the guide shuttle when the lifting assembly is arranged inside the vehicle body, such that the horizontal alignment of the lifting frame part is stabilised and maintained. In other words, such that horizontal misalignment of the lifting frame part is restricted.

In an embodiment of the storage system, the container lift vehicle comprises a first set of wheels and a second set of wheels, the first set of wheels for moving the container lift vehicle in a first direction on the top rail grid, and the second set of wheels for moving the container lift vehicle in a second direction on the top rail grid, the second direction being perpendicular to the first direction, and the first set of wheels are displaceable in a vertical direction between a first position, wherein the first set of wheels allow movement of the container lift vehicle in the first direction, and a second position, wherein the second set of wheels allow movement of the container lift vehicle in the second direction.

In an embodiment of the storage system, the internal guide surfaces are arranged in vertical planes corresponding to the vertical guide surfaces of a grid column from which a storage container is lifted. In other words, the internal guide surfaces are arranged to be in the same vertical planes as the corresponding vertical guide surfaces of a grid column in which a storage container is to be lifted or lowered by the container lift.

In an embodiment of the storage system, the container lift comprises a gantry extending over at least a section of the top rail grid. The lifting assembly or lifting device of the container lift may be connected to the gantry, such that the lifting assembly may move in a lateral direction relative to the top rail grid. The gantry may have a lower level above an upper level of a container handling vehicle, such that the container handling vehicle may access a grid column below the gantry.

In an embodiment of the storage system, the spoolable lifting element may have a length greater than 6 meters, greater than 7, greater than 8 meters, greater than 9 meters, or greater than 10 meters.

In an embodiment of the storage system, the container lift may comprise a spoolable lifting element having a length greater than the height of the storage grid.

In an embodiment, the storage system comprises two storage grids, wherein a first storage grid is arranged above a second storage grid, and the container lift is arranged to lift or raise a storage container between a top rail grid of the first storage grid and the top rail grid of the second storage grid.

In an embodiment, the storage system may comprise at least one transfer column, extending from a bottom of the storage grid, such that the container lift may raise or lower a storage container between the bottom of the storage grid and a position below the bottom of the storage grid. A transfer column extending from the bottom of a storage grid may also be termed a guide column. The transfer column may extend from the bottom to a container guiding assembly or a picking/supply station.

In an embodiment of the storage system, the container lift is arranged to lift or raise a storage container between the top rail grid and a position below a bottom, or lowest level, of the storage grid.

In a second aspect, the present invention provides a container lift vehicle for a storage system according to the first aspect, comprising a vehicle body comprising internal vertical guide surfaces; at least one set of wheels for moving the container lift vehicle in a horizontal direction on a top rail grid; and a lifting device arranged to lift a storage container from a grid column and into the vehicle body, wherein the lifting device comprises a lifting assembly, comprising a lifting frame part and a guide shuttle, at least one spoolable lifting element and at least one lifting shaft, wherein the spoolable lifting element connects the lifting shaft and the lifting assembly, such that the lifting assembly may move in a vertical direction by rotation of the lifting shaft, the lifting frame part is for releasable connection to a storage container, and the guide shuttle is arranged above the lifting frame part and comprises guide elements arranged to interact with the internal vertical guide surfaces, such that the horizontal alignment of the lifting frame part is stabilised and maintained when accommodated inside the vehicle body.

In other words, the guide elements are arranged to interact with the internal vertical guide surfaces, such that horizontal tilting and/or horizontal misalignment of the lifting frame part is restricted.

The spoolable lifting element may be spooled onto the lifting shaft when the lifting shaft is rotated.

The lifting frame part may releasably connect to a topside of a storage container. The lifting frame part may comprise gripper elements arranged on the bottom side of the lifting frame part.

In an embodiment of the container lift vehicle, the guide shuttle comprises four vertically extended corner sections and at least one of the guide elements is arranged at each corner section to interact with the internal vertical guide surfaces of the vehicle body.

In an embodiment of the container lift vehicle, the internal vertical guide surfaces are arranged at each of four inside corners of a cavity, or internal section, of the vehicle body, in which cavity or section a storage container may be accommodated.

The container lift vehicle may comprise any of the features of the container lift defined in the first aspect of the invention.

In an embodiment of the container lift vehicle, the guide elements comprise sliding devices, roller assemblies or any combination thereof.

In an embodiment of the container lift vehicle, the roller assemblies and the sliding devices comprise at least one rotatable circumference and sliding surface, respectively, arranged to interact with a corresponding internal vertical guide surface of the vehicle body.

In an embodiment of the container lift vehicle, the roller assemblies comprise at least two guide wheels arranged at each corner section of the guide shuttle, the two guide wheels arranged to rotate in perpendicular vertical planes.

In an embodiment of the container lift vehicle, the roller assemblies comprise a first roller assembly and a second roller assembly arranged at different levels of a corner section.

In an embodiment of the container lift vehicle, the first roller assembly comprises a first guide wheel and a second guide wheel, arranged to rotate in a corresponding first and second vertical plane being perpendicular to each other. Each of the first and second vertical plane may be perpendicular to corresponding internal vertical guide surfaces with which the guide wheels may interact.

In other words, the first guide wheel and the second guide wheel are arranged to rotate in a first vertical plane and a second vertical plane, respectively, and the first vertical plane is perpendicular to the second vertical plane.

In an embodiment of the container lift vehicle, the second roller assembly comprises a third guide wheel and a fourth guide wheel arranged at each corner section to rotate in a corresponding third and fourth vertical plane being perpendicular to each other, wherein the third vertical plane and the fourth vertical plane are coincident or parallel to the first vertical plane and the second vertical plane, respectively, and the first guide wheel and the second guide wheel are arranged at a higher level relative to the third guide wheel and fourth guide wheel, respectively.

In a third aspect, the present invention provides a container lift for a storage system according to the first aspect, comprising a framework comprising internal vertical guide surfaces; a lifting device arranged to lift a storage container from a grid column and into the framework, wherein the lifting device comprises a lifting assembly, comprising a lifting frame part and a guide shuttle, at least one spoolable lifting element and at least one lifting shaft, wherein the spoolable lifting element connects the lifting shaft and the lifting assembly, such that the lifting assembly may move in a vertical direction by rotation of the lifting shaft, the lifting frame part is for releasable connection to a storage container, and the guide shuttle is arranged above the lifting frame part and comprises guide elements arranged to interact with the internal vertical guide surfaces, such that the horizontal alignment of the lifting frame part is stabilised and maintained when accommodated inside the framework.

In an embodiment, the container lift comprises a gantry to which the lifting assembly or lifting device may be connected, such that the lifting assembly may move in a lateral direction.

The container lift may comprise any of the features of the container lift defined in the first aspect of the invention and any of the features of the container lift vehicle defined in the second aspect.

In a fourth aspect, the present invention provides a method of transferring a storage container in a storage system according to any embodiment of the first aspect, comprising the steps of: moving the container lift to a position above a storage column in which the storage container is arranged; lowering the lifting assembly to releasably connect the lifting frame part to an upper section of the storage container; raising the lifting assembly and the storage container to a level above the top rail grid; moving the container lift to a position above a transfer column; and lowering the lifting assembly through the transfer column while stabilizing the horizontal alignment of the lifting frame part by interacting the guide elements with the four column profiles of the transfer column.

BRIEF DESCRIPTION OF DRAWINGS

Embodiments of the invention will now be described in greater detail by way of example only and with reference to the following drawings:

FIGS. 25A-25C are views of a third exemplary container lift vehicle according to the invention.

DETAILED DESCRIPTION

Figure 1A:
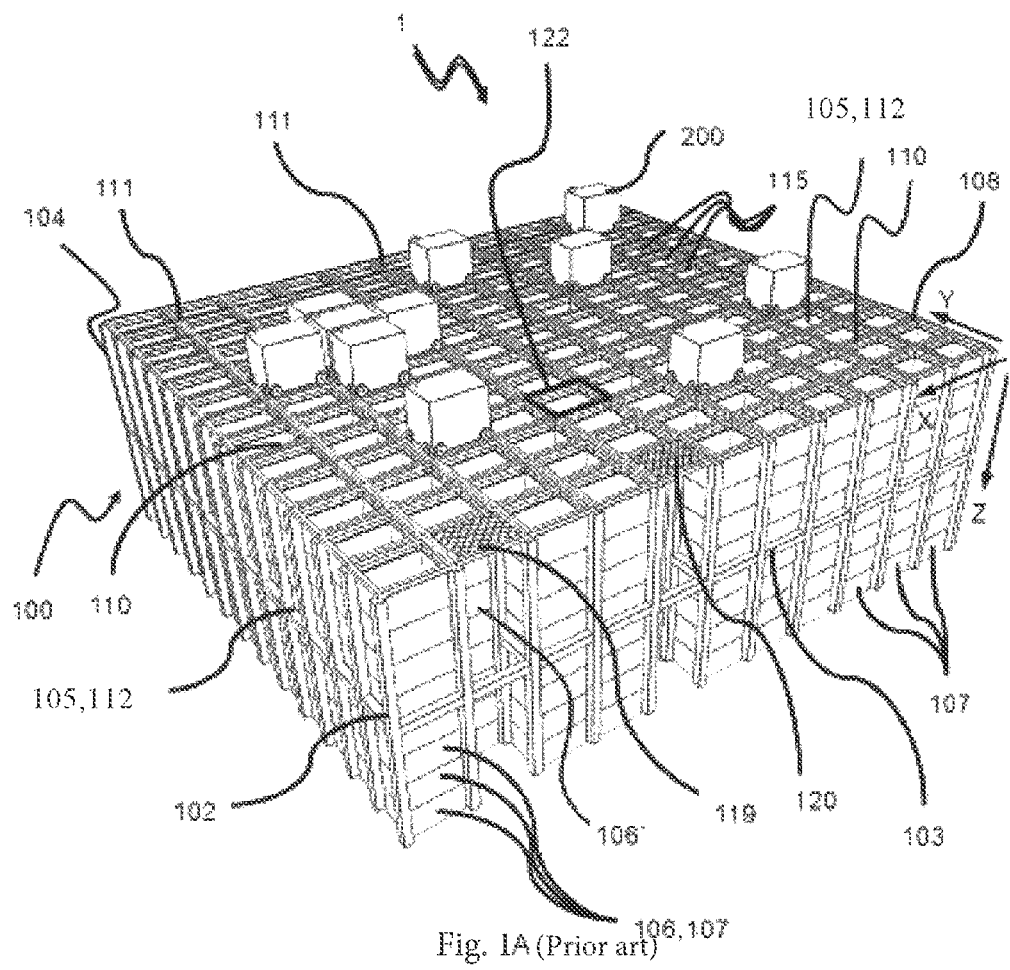
FIGS. 1A and 1B are perspective views of a first prior art storage system and a first prior art container handling vehicle.
Figure 1B:
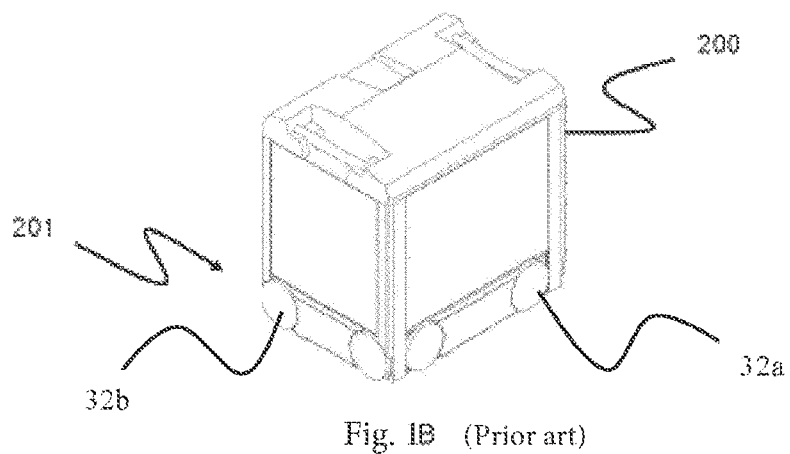
Figure 2A:
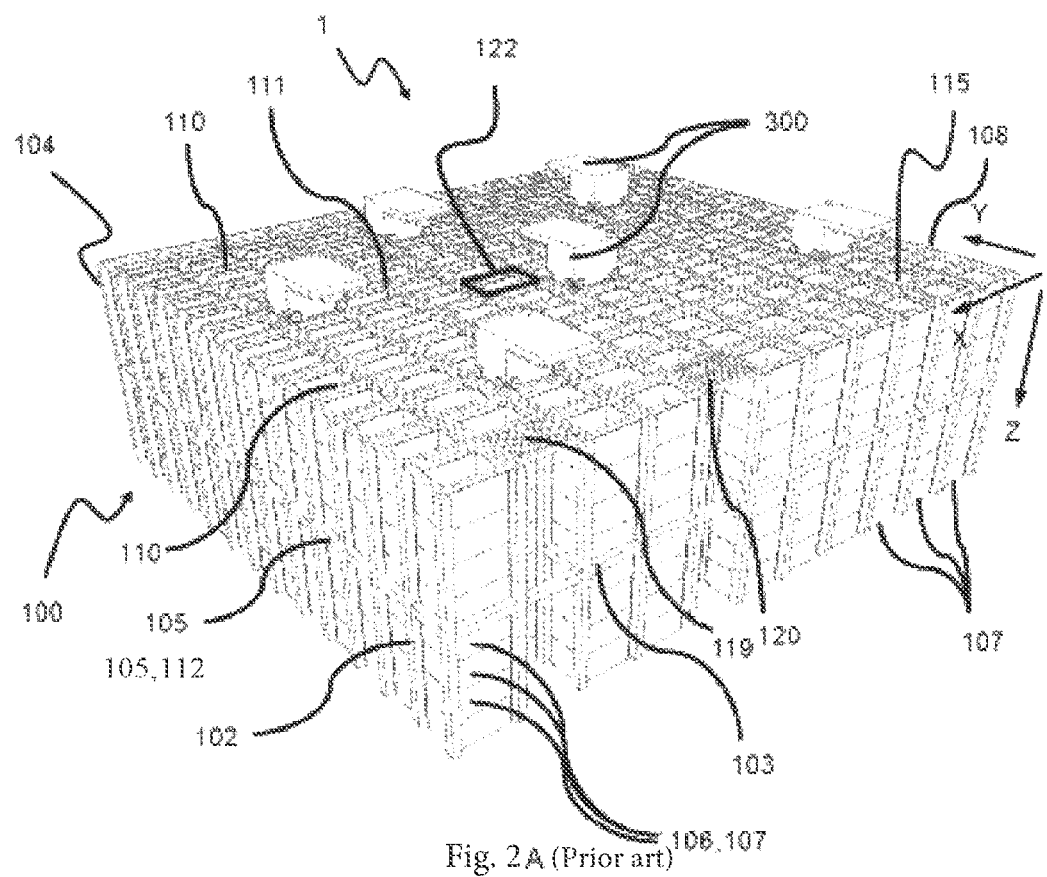
FIGS. 2A and 2B are perspective view of a second prior art storage system and a second prior art container handling vehicle.
Figure 2B:
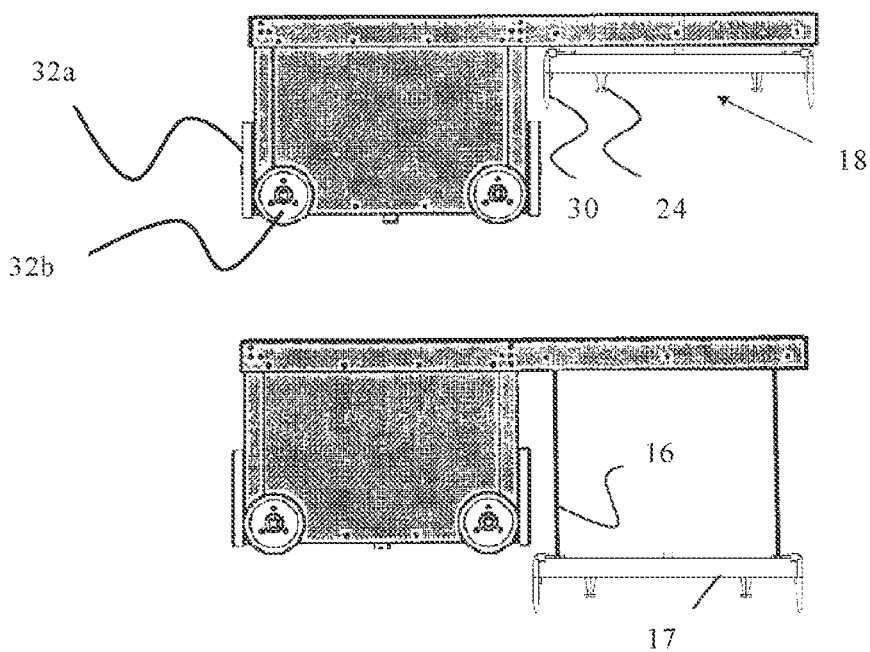

As described above in connection with the prior art storage systems in FIGS. 1A, 1B, 2A, 2B and 5, use of dedicated container lifts 50 are required when a storage container is to be moved vertically over more than about 6 m.

The present invention provides a container lift vehicle which allows for highly flexible storage systems, wherein the use of dedicated container lifts 50 are no longer required. The container lift vehicle may be used to move a storage container over vertical distances exceeding what is possible by the prior art container handling vehicles and may be used to transfer storage containers between two vertically separated storage grids and/or between a raised storage grid, e.g. a storage grid on a mezzanine, and a picking/supply station arranged below the storage grid. The container lift vehicle provides for a highly flexible lift system in which the container capacity may easily adapted by increasing or reducing the number of container lift vehicles and/or grid columns through which the containers are moved, i.e. transfer columns.

In the exemplary embodiments below, the columns of the storage grids 104 are only described as grid columns 112. However, as described for the prior art storage systems in FIGS. 1 and 2, grid columns 112 used for storage of the storage containers 106 may also be termed storage columns 105, while grid columns used to e.g. transfer storage containers between a top rail grid and a picking/stocking station or between separate storage grids may be termed transfer columns 119,120.

Figure 7:
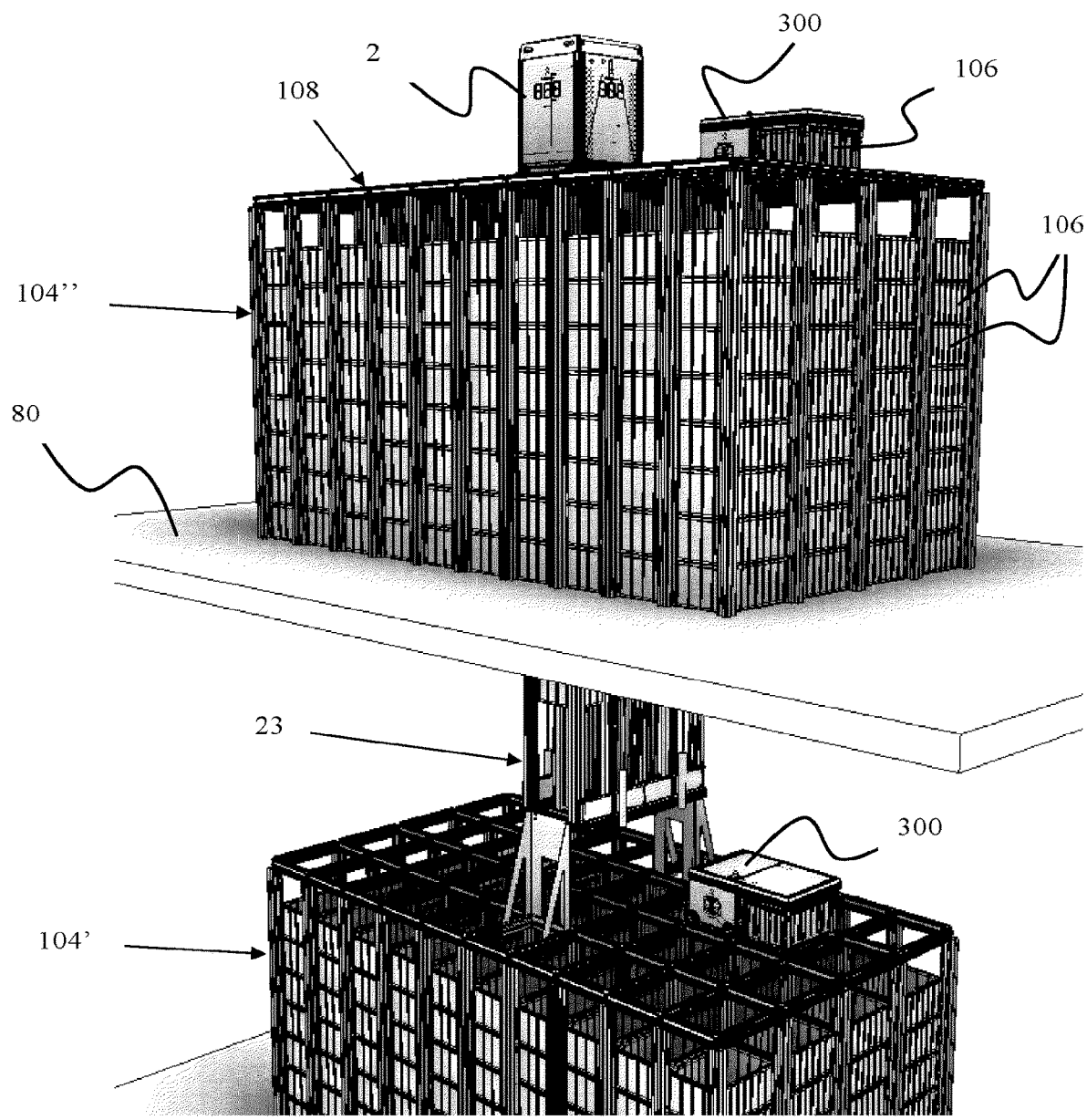
FIG. 7 is a perspective view of a first exemplary storage system according to the invention.
Figure 8:
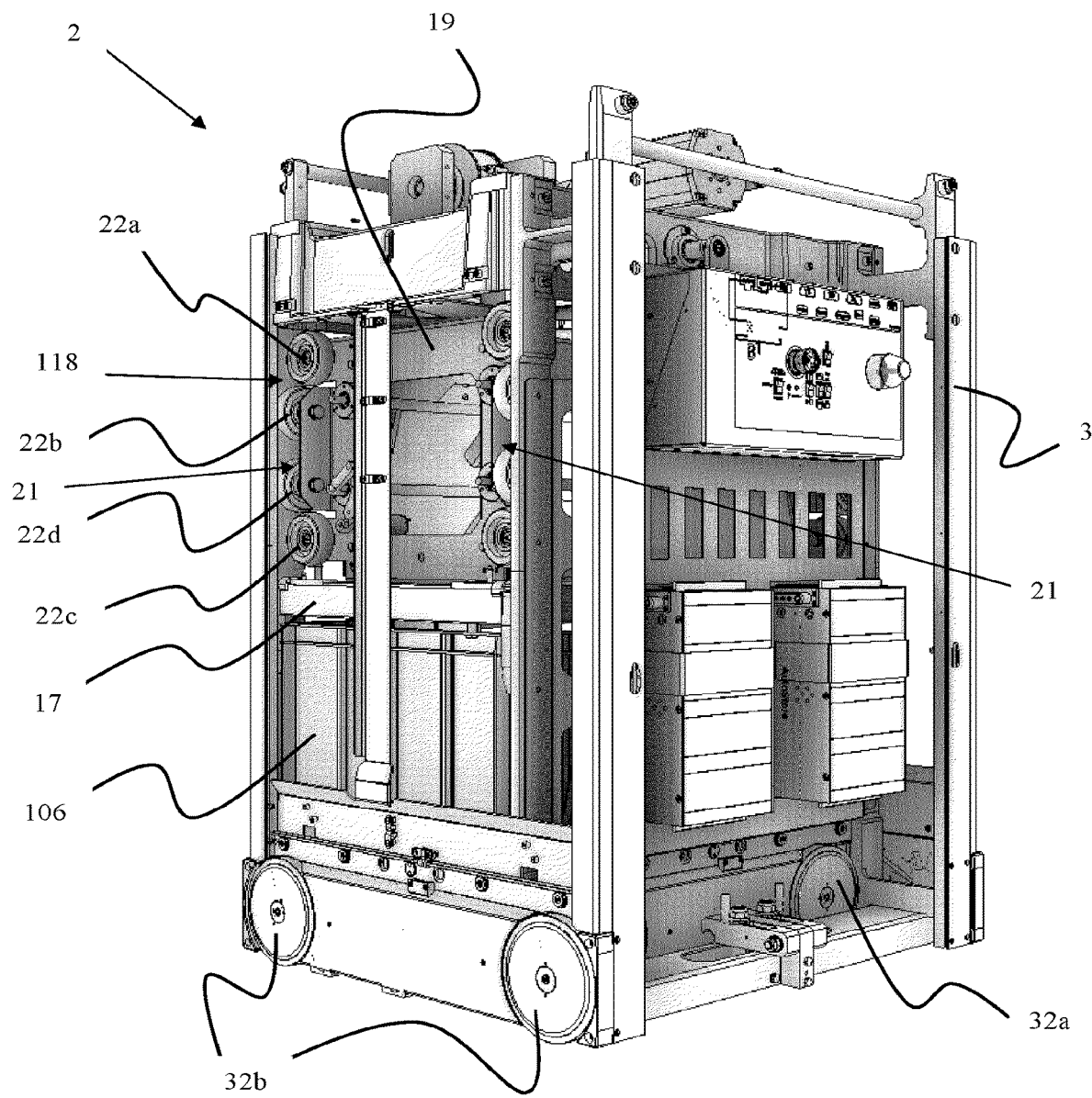
FIGS. 8-12 are perspective and side views of a first exemplary container lift vehicle according to the invention.
Figure 9:
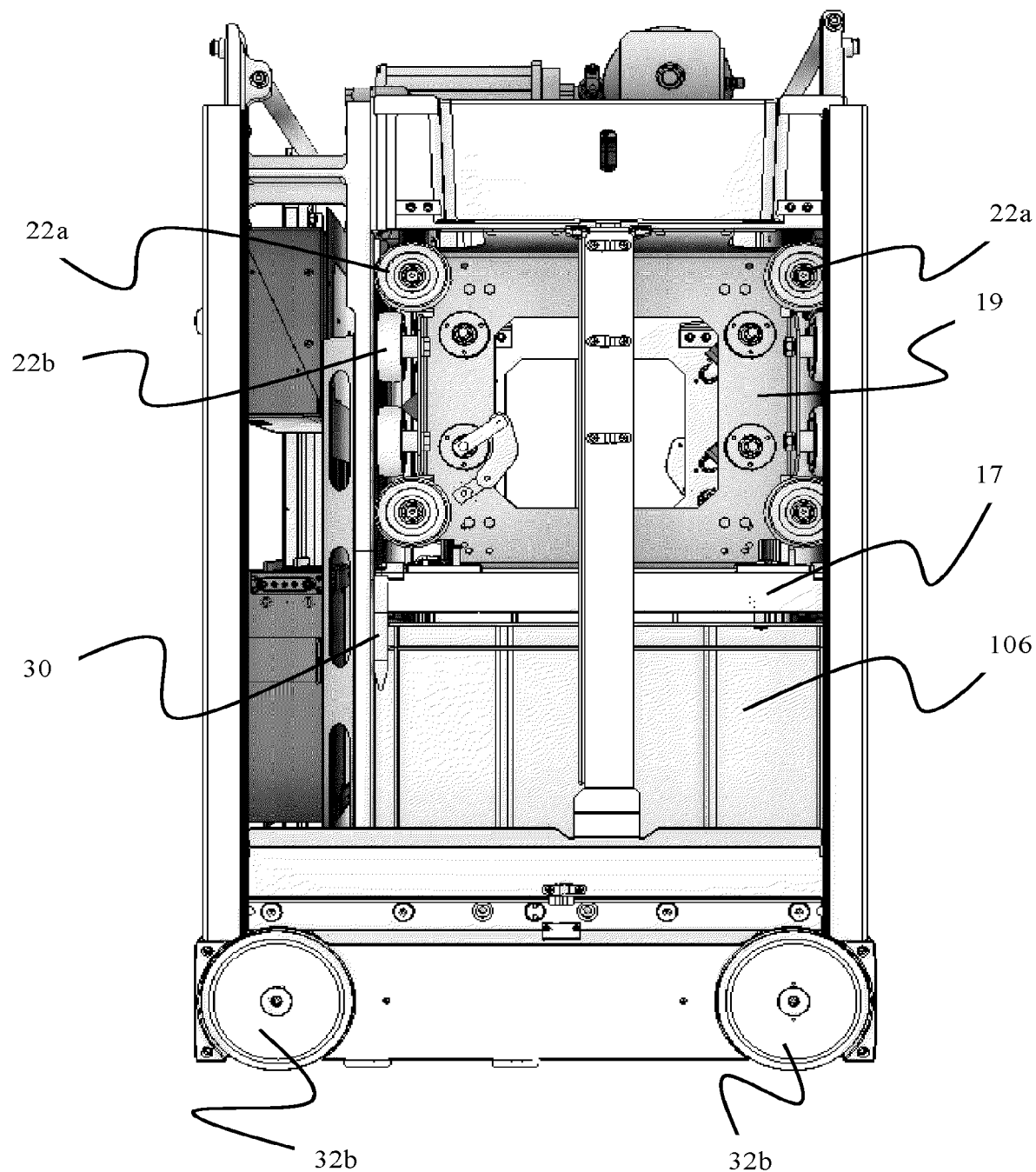
Figure 10:
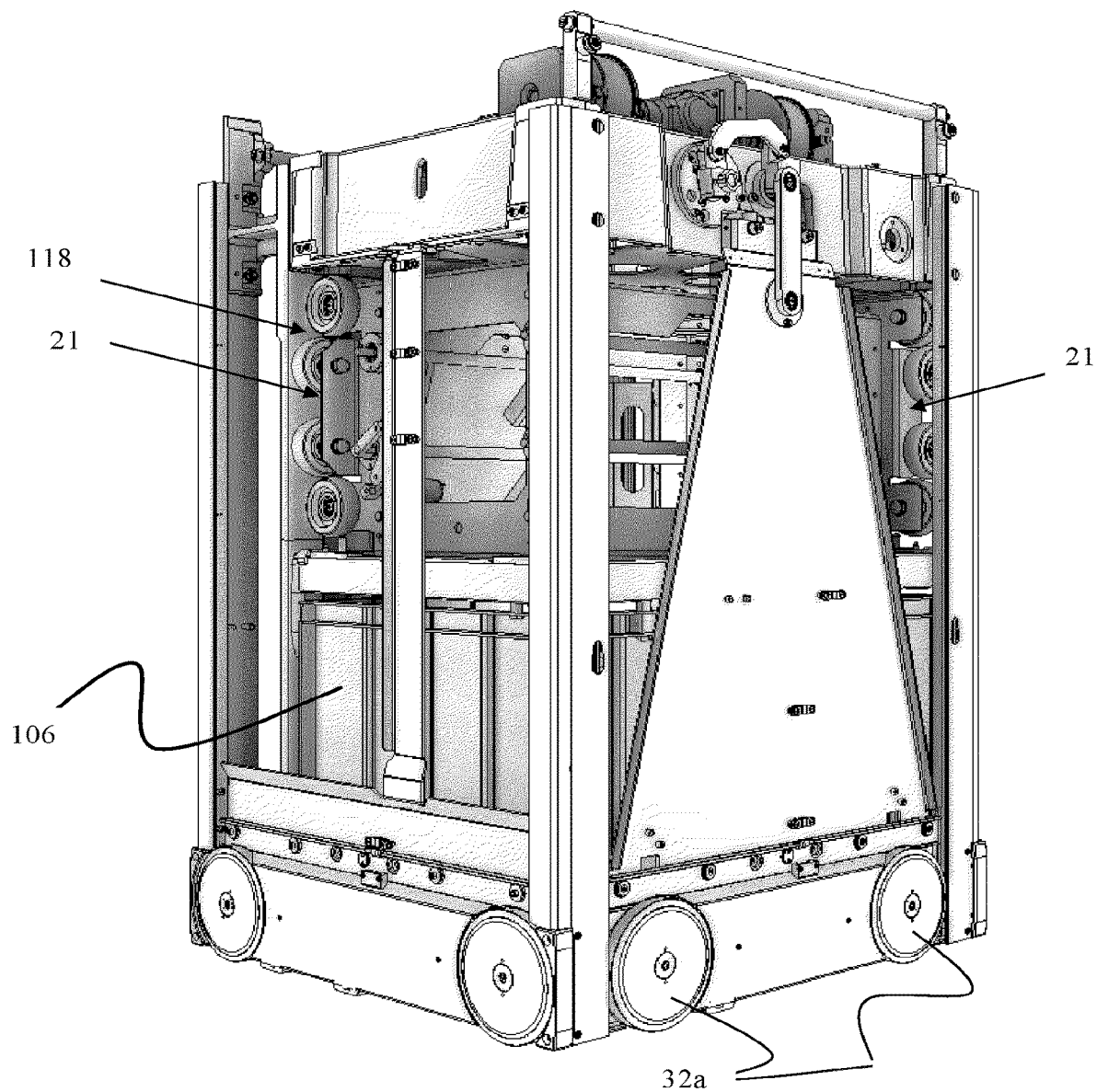
Figure 11:
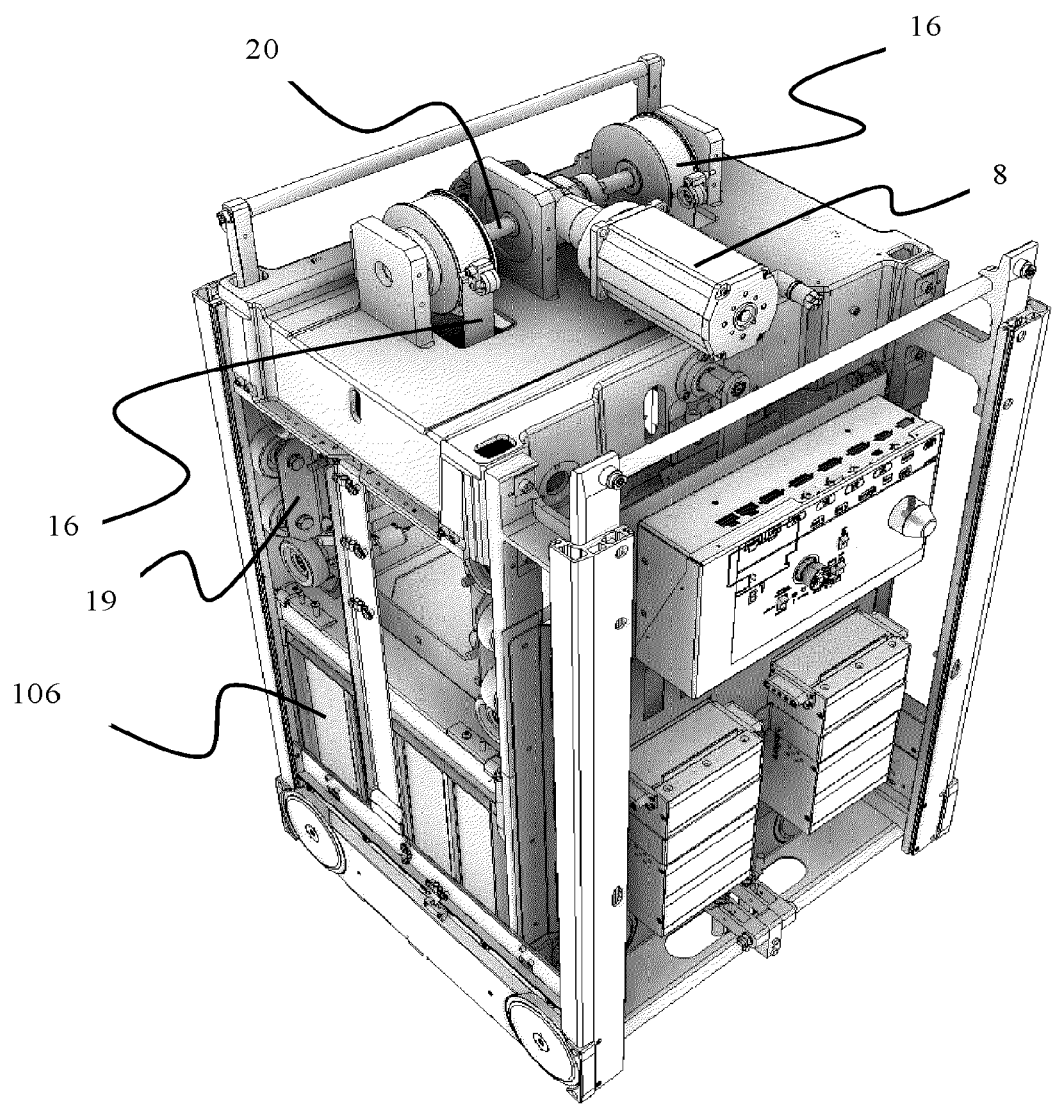
Figure 12:
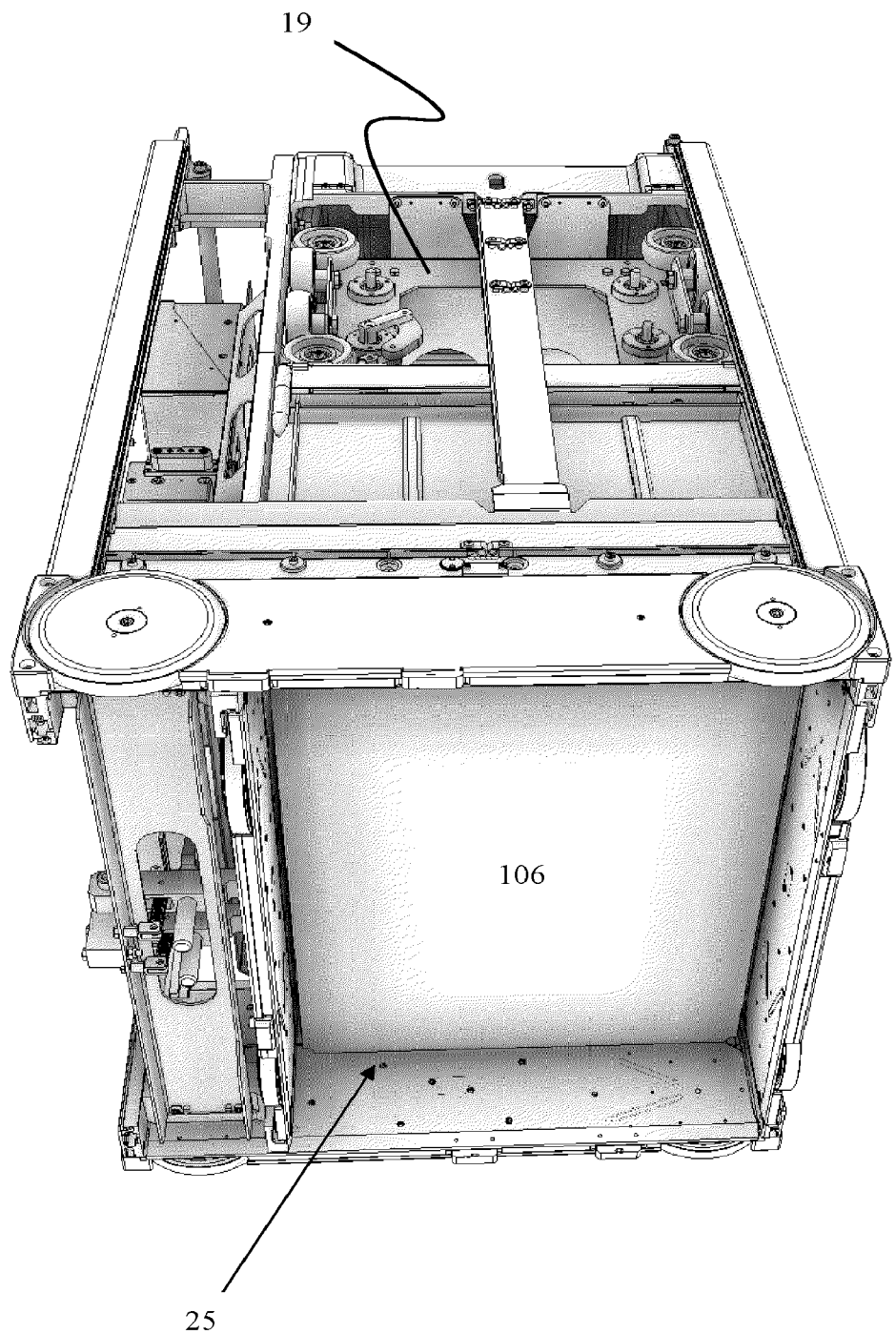
Figure 15:
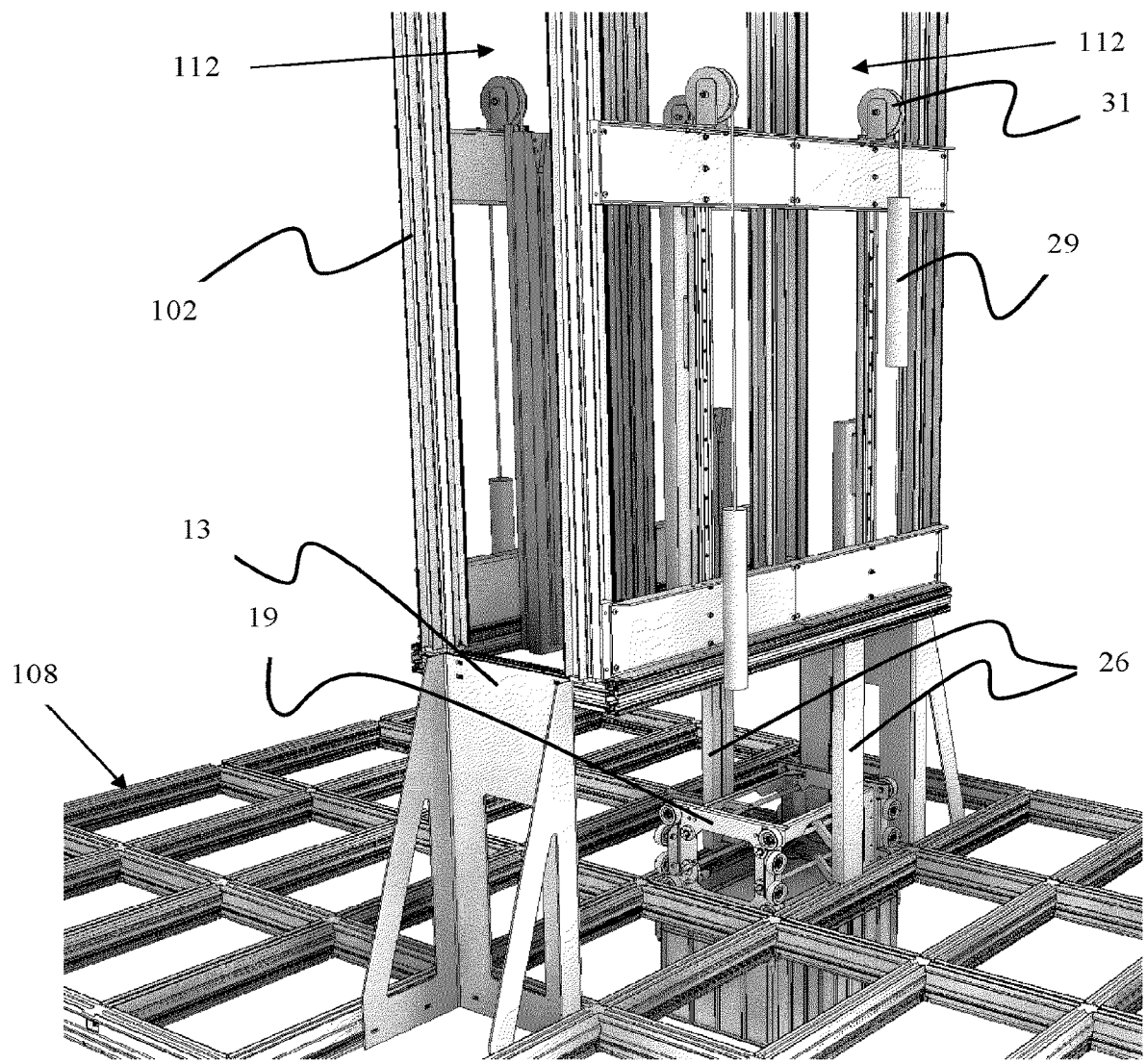
FIGS. 15 and 16 are perspective views of a container guiding assembly arranged between the two storage grids in FIG. 7.
Figure 16:
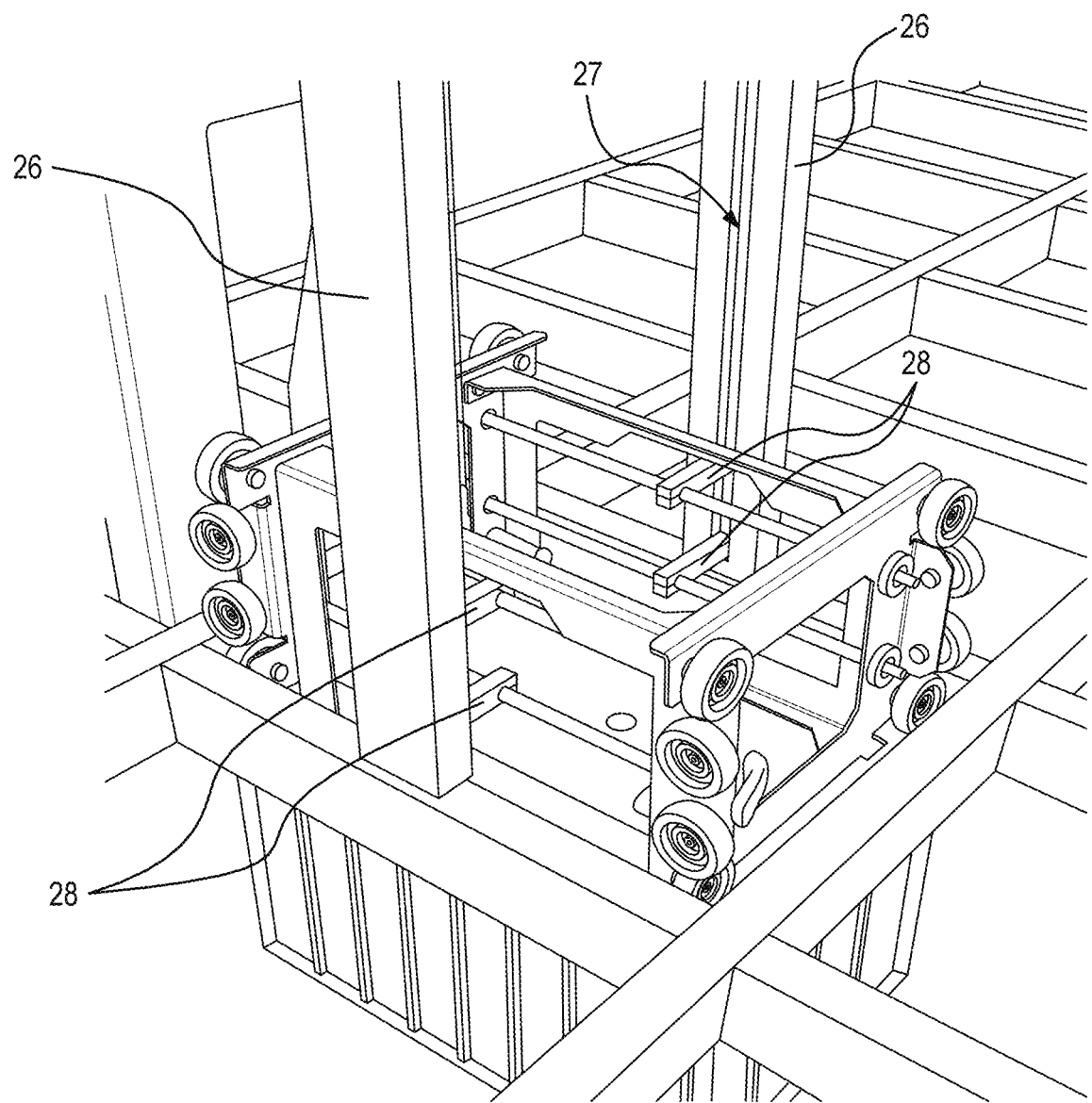

A first exemplary embodiment of a storage system 1 is shown in FIG. 7. The storage system features two vertically separated storage grids 104',104", container handling vehicles 200 arranged on the top rail grid 108 of each storage grid, and a container lift vehicle 2 arranged on the top rail grid of the upper storage grid 104". The upper storage grid is arranged on a mezzanine 80. In this embodiment, the container lift vehicle 2 is arranged to lift/raise storage containers 106 between the top rail grid 108 of the upper storage grid 104" and the lower storage grid 104'. A container guiding assembly 23 is arranged between the upper and lower storage grid. The container guiding assembly 23 is arranged to interact with the guide shuttle 19 such that tilting of the lifting frame 17 is avoided when the guide shuttle is not interacting with a grid column 112, i.e. when the guide shuttle 19 is at a position between a lower level of the upper storage grid 104" and the top rail grid 108 of the lower storage grid 104'. Details of the container guiding assembly 23 is shown in FIG. 15 and FIG. 16.

Figure 3:
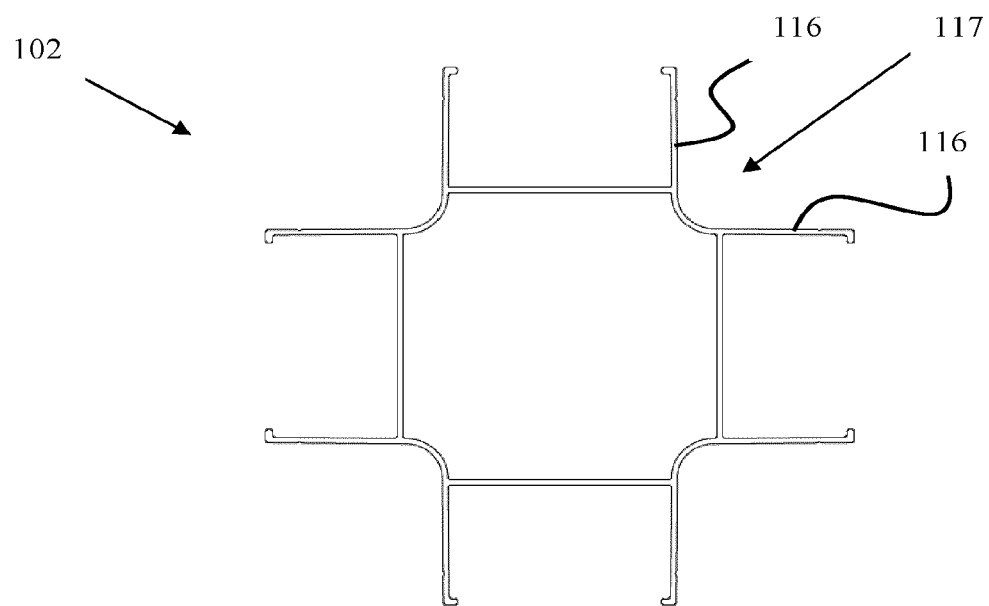
FIG. 3 is a cross-sectional view of a prior art vertical column profile.

The container lift vehicle is shown in detail in FIGS. 8-12 and features a first set of wheels 32a and a second set of wheels 32b for moving the container lift vehicle 2 in two perpendicular directions on the top rail grid 108. A lifting device 18 similar to that shown in FIG. 3 is arranged to lift a storage container 106 from a grid column 112 of the upper storage grid 104" and into a cavity 25 of the vehicle body 3. When accommodated in the cavity 25, the storage container 106 is at a level above the top rail grid 108, i.e. such that the container lift vehicle 2 may move upon the top rail grid 108 while accommodating the storage container.

The lifting device 18 features a lifting assembly comprising a lifting frame part 17 and a guide shuttle 19, two lifting bands 16 (i.e. two spoolable lifting elements) and a lifting shaft 20 connected to a motor 8. The lifting bands 16 are connected to spools 9 on the lifting shaft 20 and the lifting frame part 17, such that the lifting frame part 17 will move in a vertical direction when the lifting shaft 20 rotates. The lifting frame part 17 features connecting elements (shown as 24, FIG. 17) and guiding pins 30 for releasable connection to a storage container 106.

Figure 13:
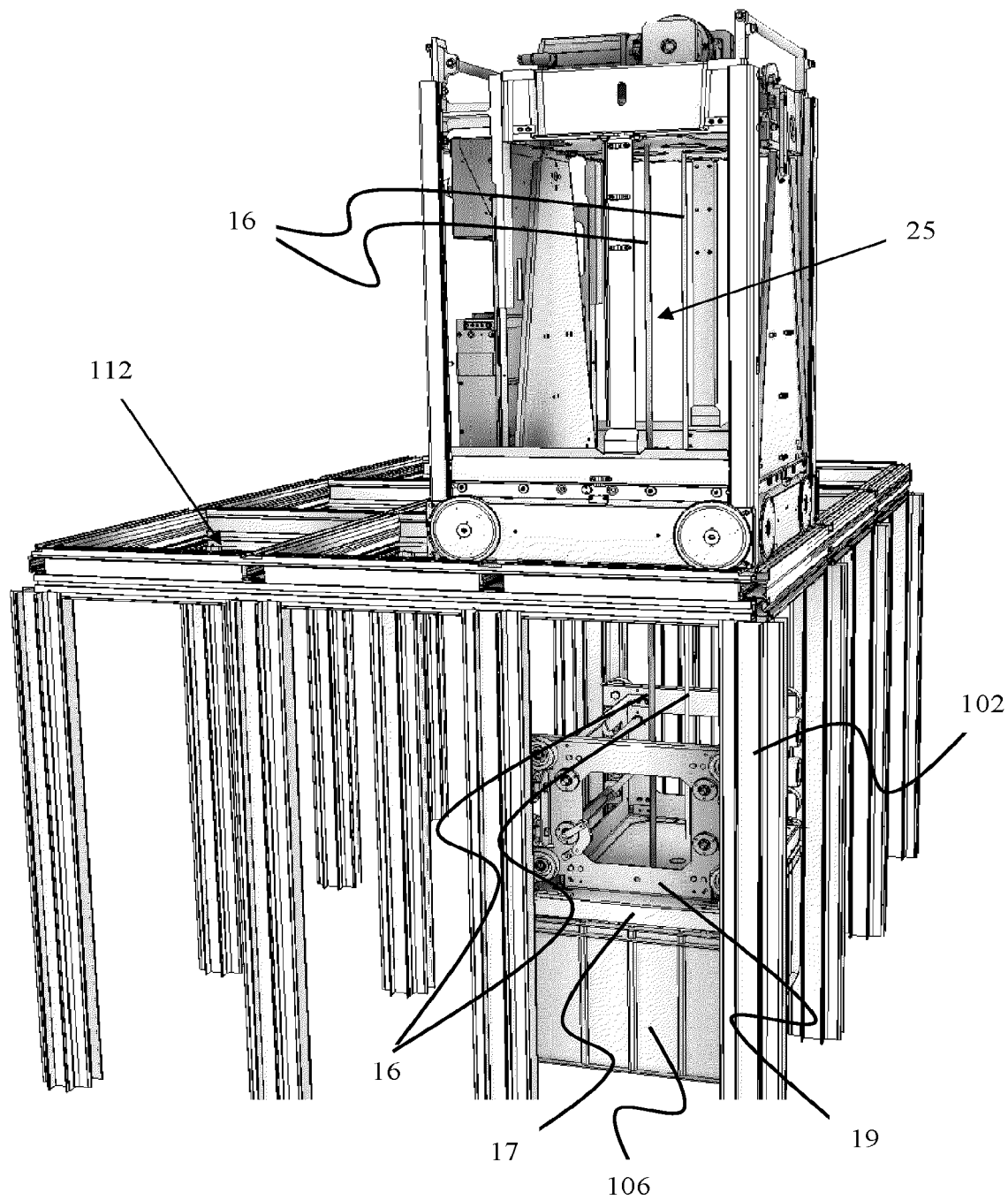
FIGS. 13 and 14 are perspective views of a first container lift vehicle as shown in FIGS. 8-12 arranged on a storage grid.
Figure 14:
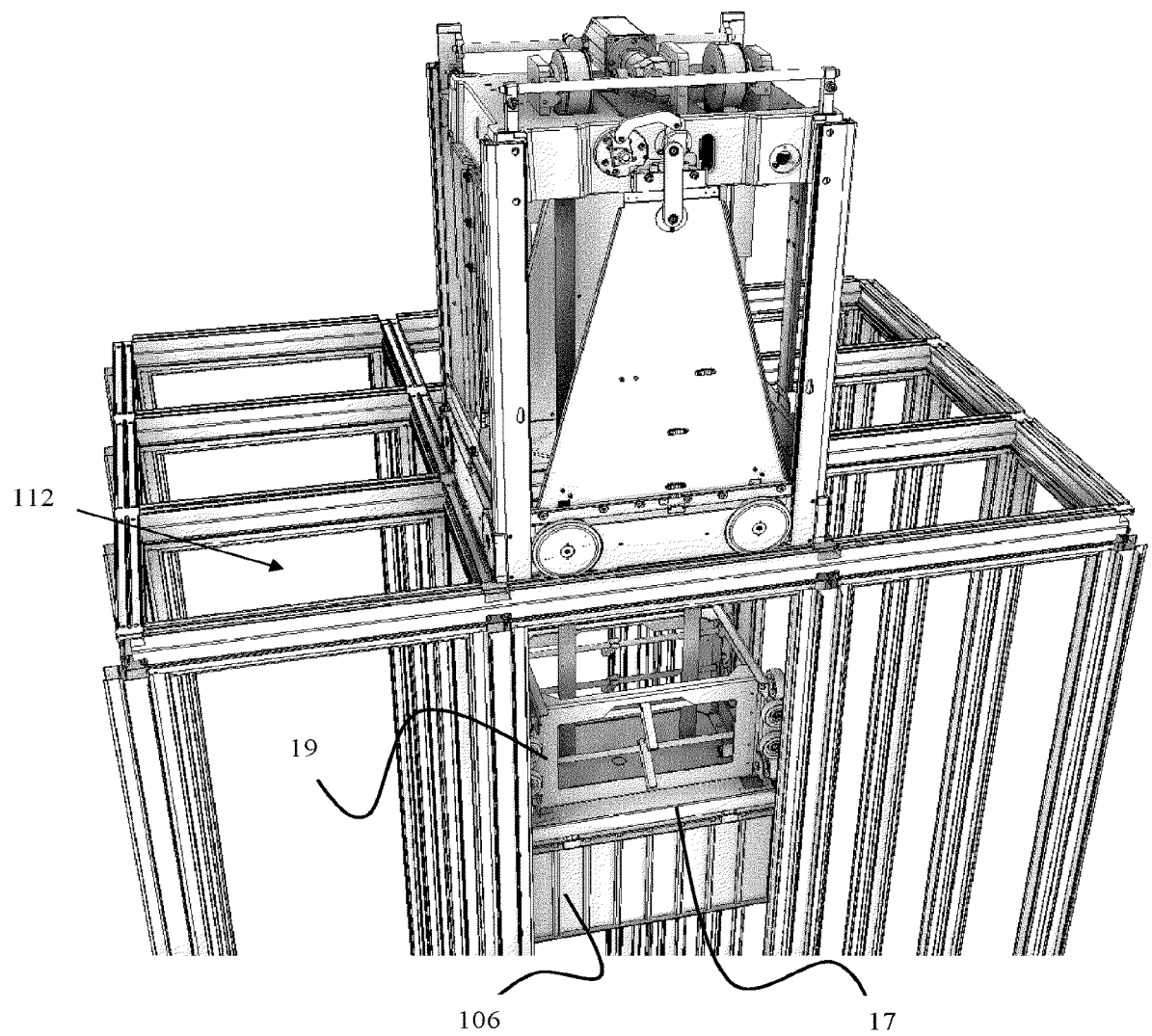
Figure 17:
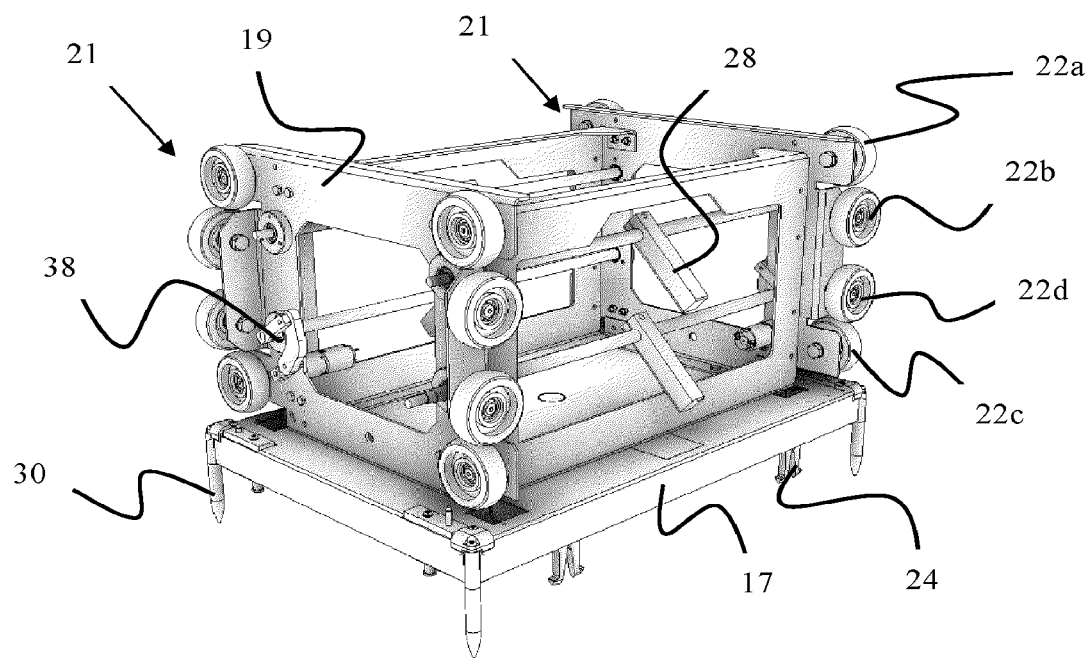
FIG. 17 is a perspective view of a first exemplary guide shuttle.
Figure 18:
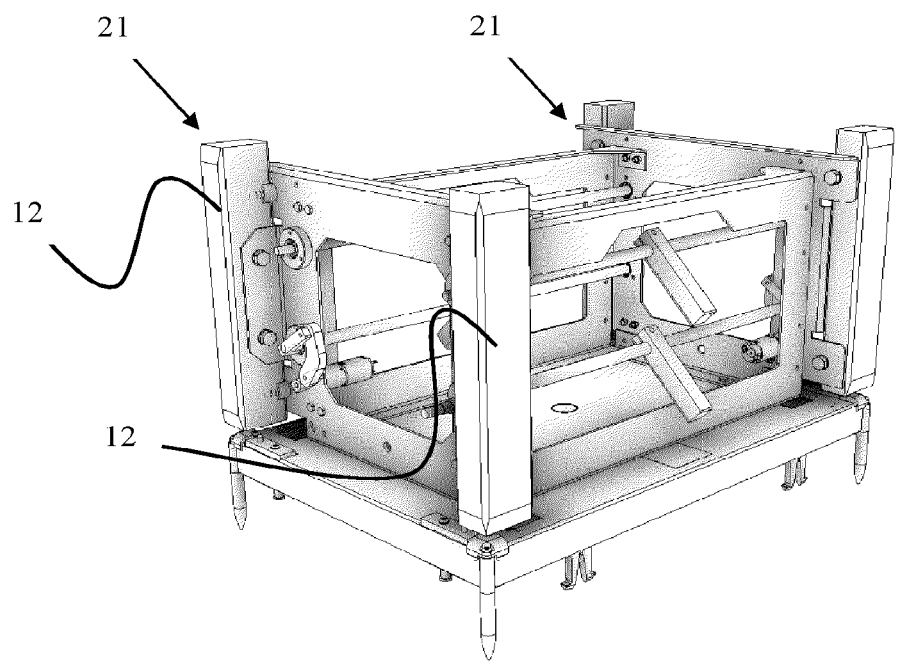
FIG. 18 is a perspective view of a second exemplary guide shuttle.

As seen in FIGS. 17, 18, the guide shuttle 19 is connected at a topside of the lifting frame 17 part and comprises four corner sections 21. The main function of the guide shuttle 19 is to restrict tilting of the lifting frame part 17 when lifting/lowering the lifting frame part through a grid column 112 of a storage grid 104, see FIGS. 13 and 14. A further function of the guide shuttle 19 is to ensure that the lifting frame part 17 is horizontal when arranged within the container lift vehicle 2.

The guide shuttle achieves this function through providing guiding elements that is able to engage the guide surfaces 116 of a grid column 112, in particular with a transfer column 119,120, and hence guide the vertical movement of the lifting frame part 17 as it moves vertically with the lifting frame part 17, the guiding taking place from a location close to or adjacent the lifting frame part 17. The guide shuttle 19 may be connected directly to the lifting frame part 17, may be an integral part of the lifting frame part or may be connected by an intermediary part (or parts) which extends vertically between the guide shuttle 19 and the lifting frame part 17.

Figure 4:
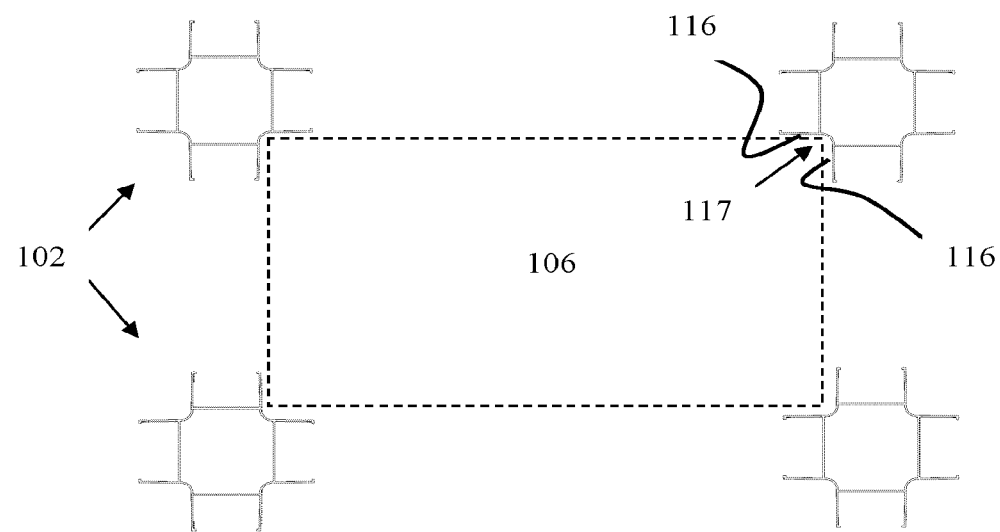
FIG. 4 is a cross-sectional view of a prior art grid column made up of four vertical column profiles as shown in FIG. 3.
Figure 5:
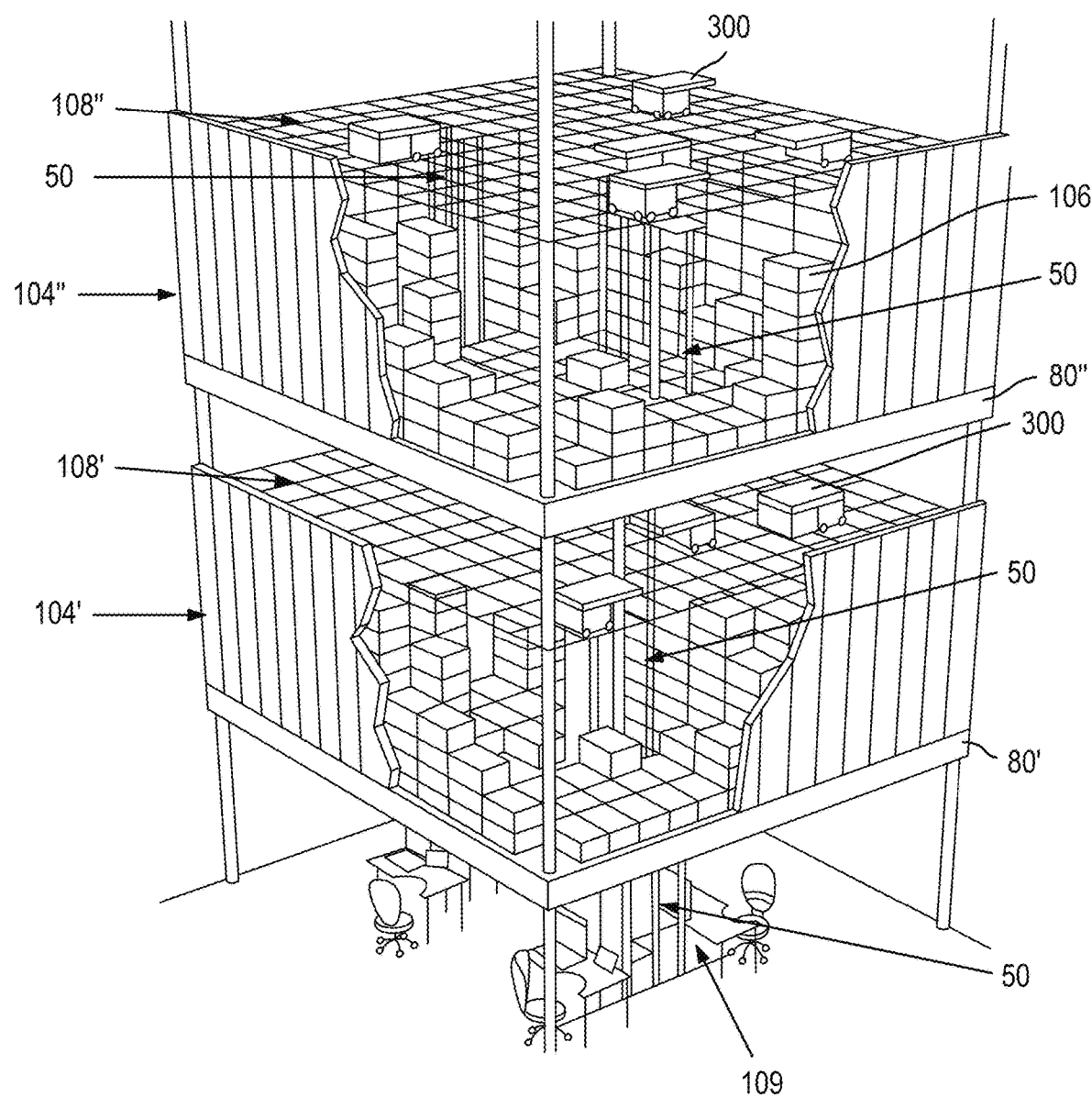
FIG. 5 is a perspective view of a third prior art storage system featuring two vertically separated storage grids.
Figure 6:
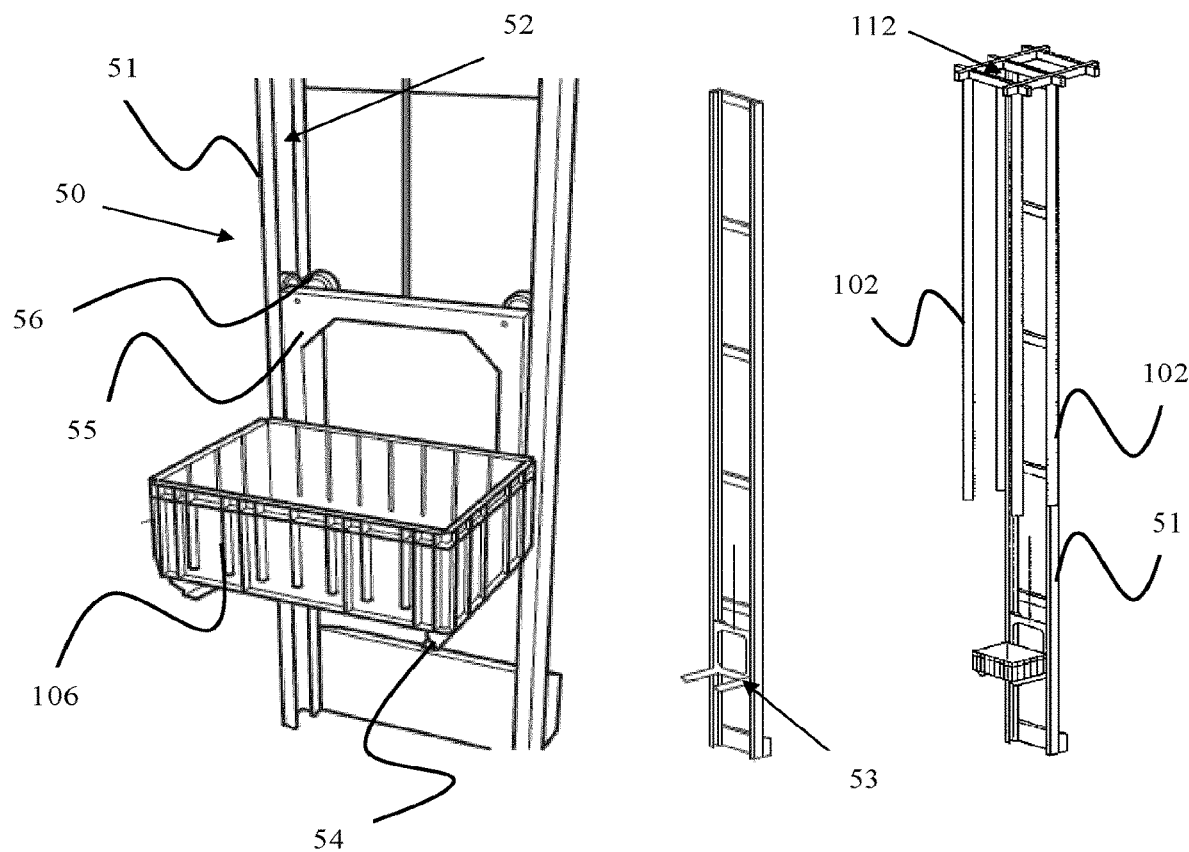
FIG. 6 are perspective views of a prior art container lift as used in the storage system in FIG. 5.

In the illustrated embodiment, each corner section 21 of the guide shuttle features four guide wheels 22a-22d (i.e. guiding elements or roller assembly). Each guide wheel has an outer circumference having about the same horizontal extent as the horizontal circumference of the lifting frame part 17. In this manner, the guide wheels 22a-22d may interact with an internal guide surface 118 of the vehicle body 3 when the guide shuttle is inside the container lift vehicle 2 and interact with the vertical guide surfaces 116 of a grid column 112 (see FIGS. 3 and 4) when moving within said grid column.

The four guide wheels feature a first pair of guide wheels 22a,22b (i.e. a first roller assembly) and a second pair of guide wheels 22c,22d (i.e. a second roller assembly), wherein the first pair is arranged at a level above the second pair. In each pair of guide wheels, the two wheels are arranged to rotate in two perpendicular vertical planes, i.e. their axles are arranged at 90° to each other. By having the first and second pair of guide wheels arranged at different levels, tilting of the guide shuttle 19, and consequently the lifting frame part 17 and any storage container 106 connected thereto, is restricted. A detailed view of the guide shuttle 19 is shown in FIG. 17.

An alternative embodiment of a guide shuttle 2' is shown in FIG. 18. In the alternative guide shuttle, the guide wheels 22a-22d are replaced by a vertically extended sliding block 12 (or other arrangement of slider, i.e. a guiding element having sliding surfaces) arranged at each corner section 21 of the guide shuttle 2'. The sliding blocks 12 may require more frequent servicing due to wear and may not be as silent during use as the guide shuttle having guide wheels but will provide the same advantageous effect of restricting the tilt of the lifting frame 17.

Further embodiments of a guide shuttle are envisioned. Such embodiments may include any combination of guiding elements, such as roller assemblies featuring any combination of guide wheels, rotatable cylinders and rollerballs, and various types of bearing or sliding elements, such as the previously described sliding blocks. A common feature of the guiding elements is the provision of contact points or a vertical surface area at each corner of the guide shuttle, the contact points or surface areas being sufficiently separated, or extended, in a vertical direction to stabilize the lifting frame.

The preferred vertical distance between the contact points, or the height of a vertical contact area, will depend on the horizontal distance between the contact points, or the height of the contact area, and a corresponding vertical guide surface of a grid column in which the guide shuttle is moved or a corresponding inner guide surface of the container lift vehicle. The vertical distance between the contact points, or the height of the contact area, is preferably at least 25 times the horizontal distance between the contact points, or the contact area, and a corresponding vertical guide surface or internal guide surface. In relation to the width of the lifting frame part 17, the vertical separation of the contact points, or the vertical extent of the contact area, may be at least 25% or at least 50% of the width of the lifting frame part.

As opposed to the prior art container handling vehicles 200,300, the lifting device 18 of the container lift vehicle is not dependent on having four lifting bands 16 connected to the lifting frame part 17 since the horizontal positioning of the lifting frame part is ensured by the guide shuttle 19. In the container lift vehicle shown in FIGS. 8-14 only two lifting bands 16 are used.

To avoid tilting of the lifting frame part during transition between the upper storage grid 104" and the lower storage grid 104', the storage system may feature a container guiding assembly 23 as shown in FIGS. 15 and 16. The container guiding assembly 23 will also allow room for retrieval of the storage container 106 by a container handling vehicle 200, 300 arranged on the lower storage grid 104' after it has been transferred from the upper storage grid 104". The main features of the container guiding assembly 23 are a support frame 13 arranged at the top rail grid 108 of the lower storage grid 104' to support the lower ends of two grid columns 112 (or transfer columns 119/120) extending from the bottom of the upper storage grid, and two vertically moveable guiding profiles 26, each having a recess 27 for interaction with corresponding actuatable inter-grid guiding elements 28 on the guide shuttle 19. The guiding profiles are connected to counter weights 29 via pulleys 31, such that the guiding profiles are biased towards an upper position. The support frame 13 is arranged at a height allowing access for a container handling vehicle below the lower ends of the two grid columns 112 extending from the upper storage grid. The two extended grid columns may also be termed transfer columns.

To transfer a storage container 106 from the upper storage grid 104" to the lower storage grid 104', the lifting frame part 17 and storage container 106 are lowered from the upper storage grid via a grid column 112 extending down to the container guiding assembly 23. After exiting the lower level of the upper storage grid 104", the inter-grid guiding elements 28 are actuated by an actuating mechanism 38 to extend beyond the horizontal circumference of the lifting frame part 17. The inter-grid guiding elements 28 interacts with the corresponding recesses 27 of the guiding profiles 26 during the downwards movement. The guiding profiles 26 stabilizes the guide shuttle 19 during the movement of the lifting frame part 17 and storage container 106 towards a grid column 112 of the lower storage grid 104'. When the storage container has been delivered to the lower storage grid 104', the lifting frame part 17 is lifted towards the upper storage grid 104" and the guiding profiles follow the movement of the guide shuttle 19 and are returned to their upper position due to the counter-weights 29.

Figure 19:
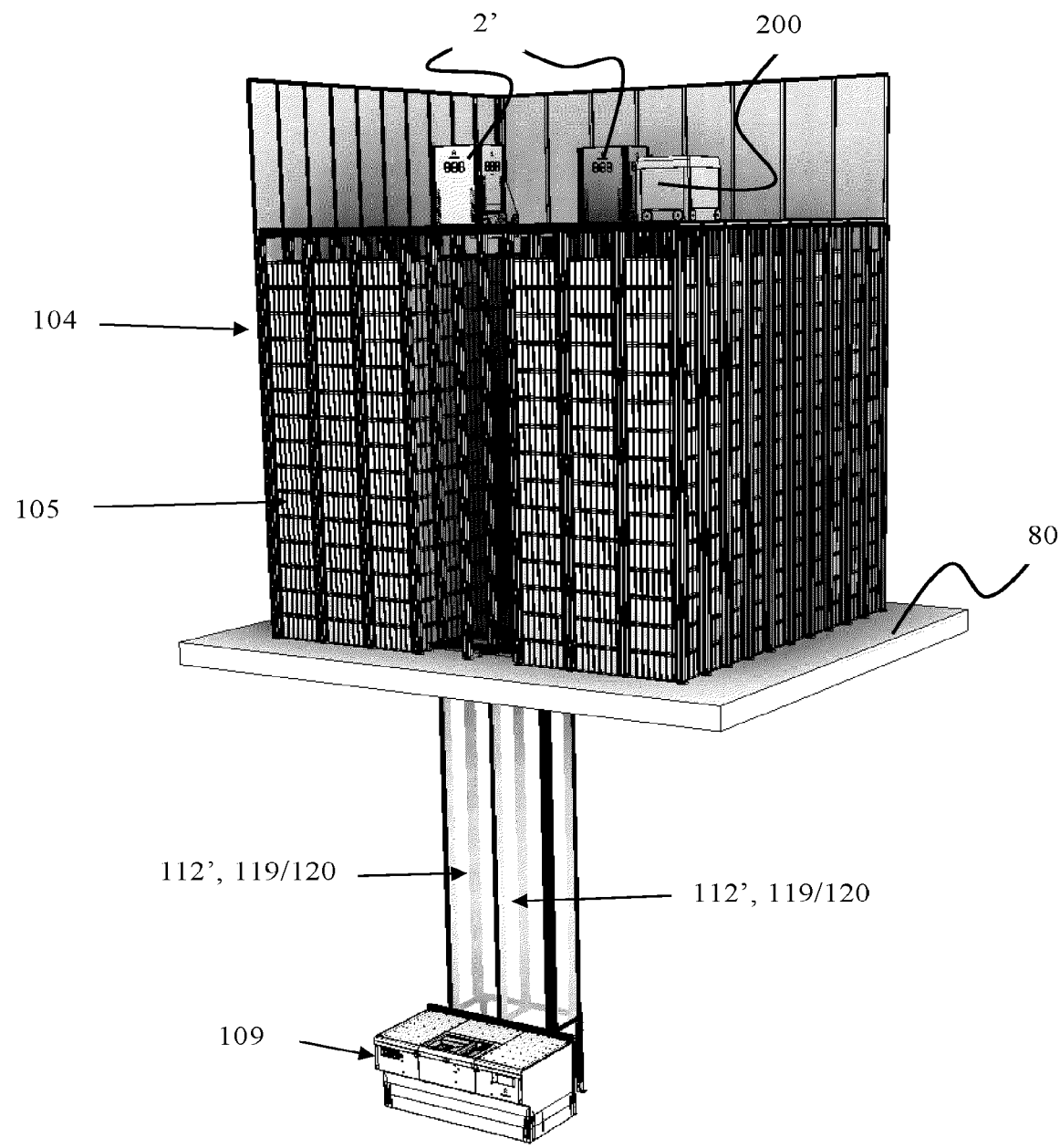
FIGS. 19 and 20 are perspective views of a second exemplary storage system according to the invention.
Figure 20:
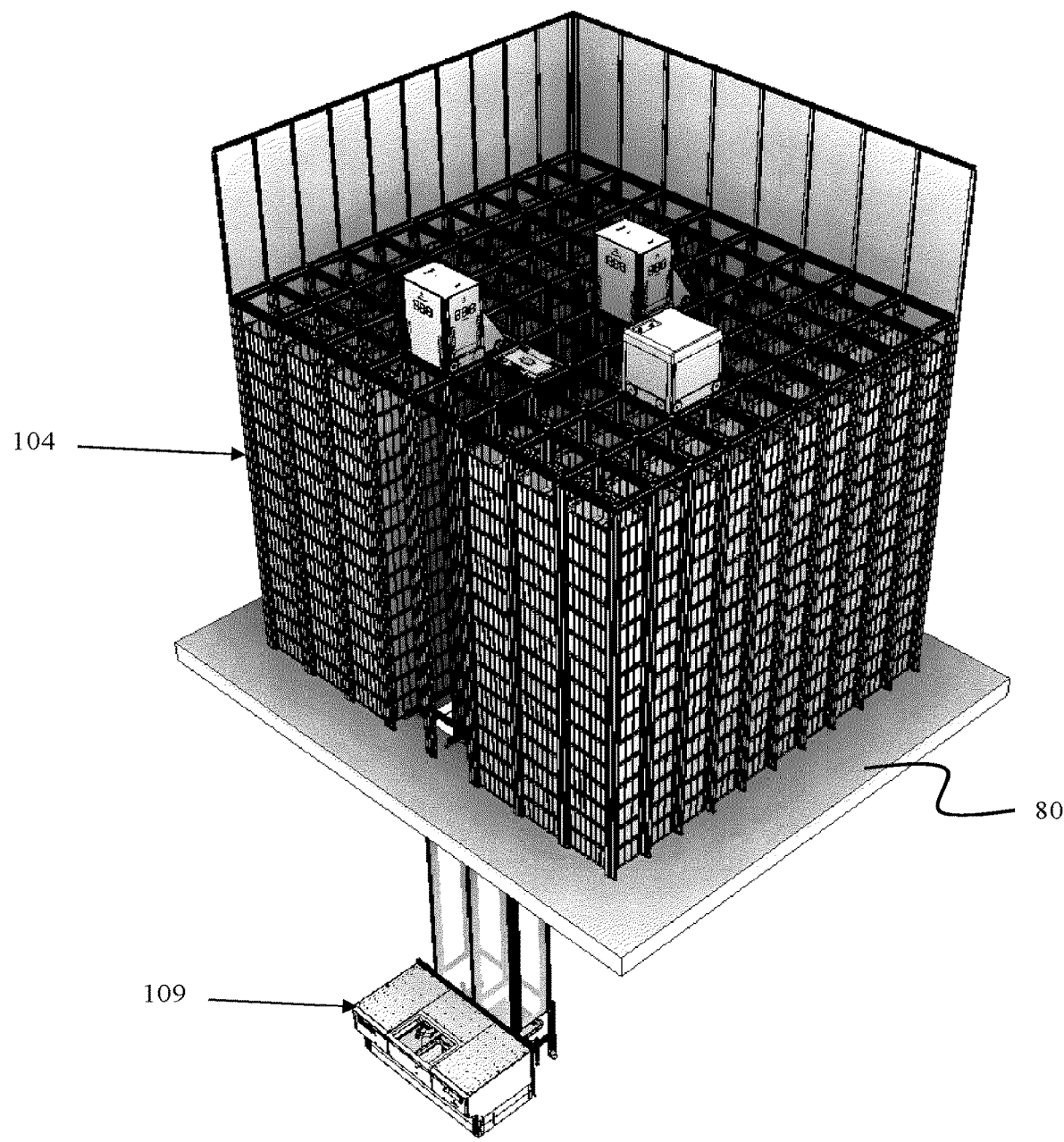
Figure 21:
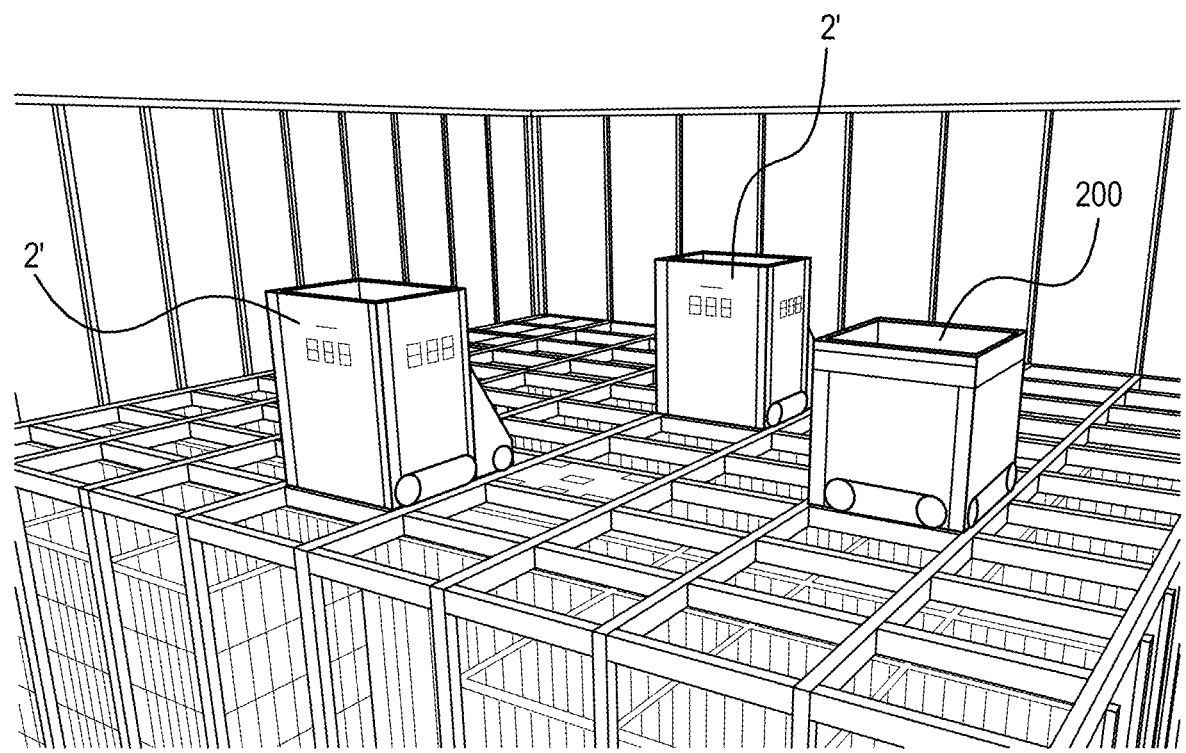
FIGS. 21-23 are perspective views of the second storage system in FIGS. 19 and 20 showing details of a second exemplary container lift vehicle according to the invention.
Figure 22:
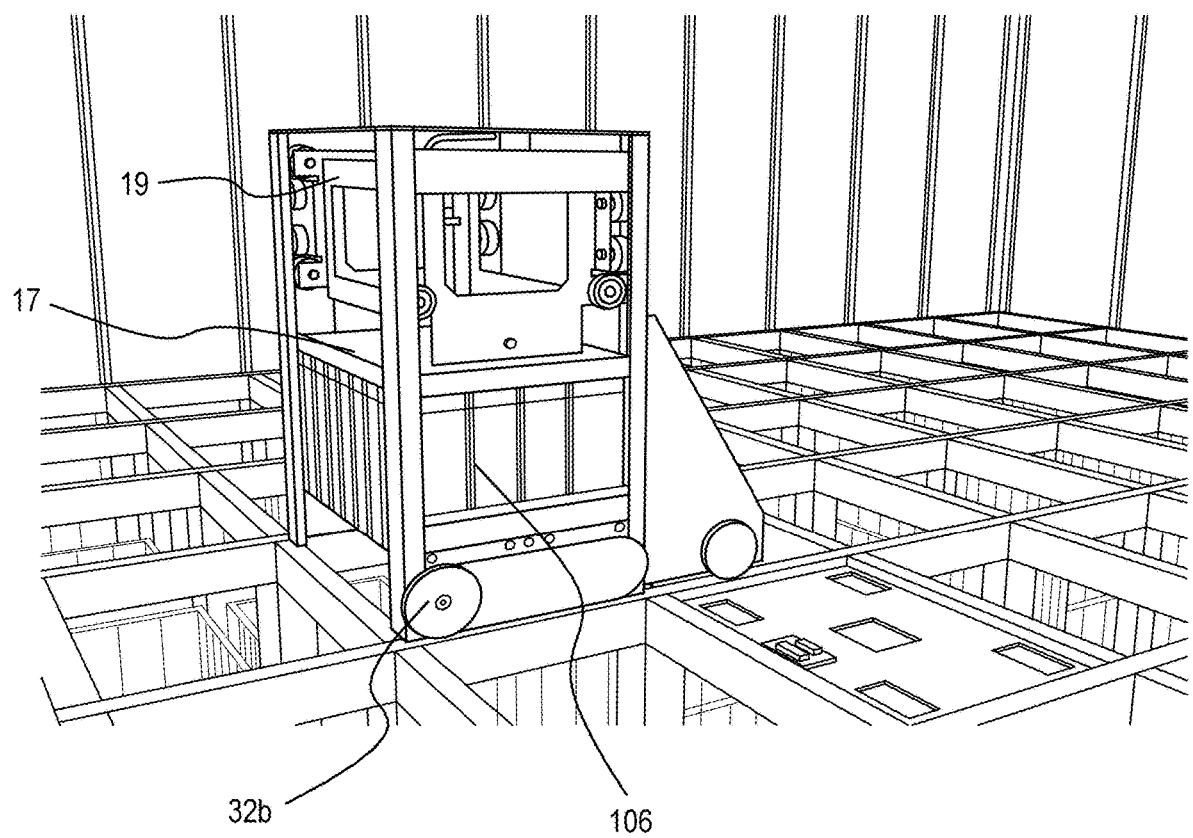
Figure 23:
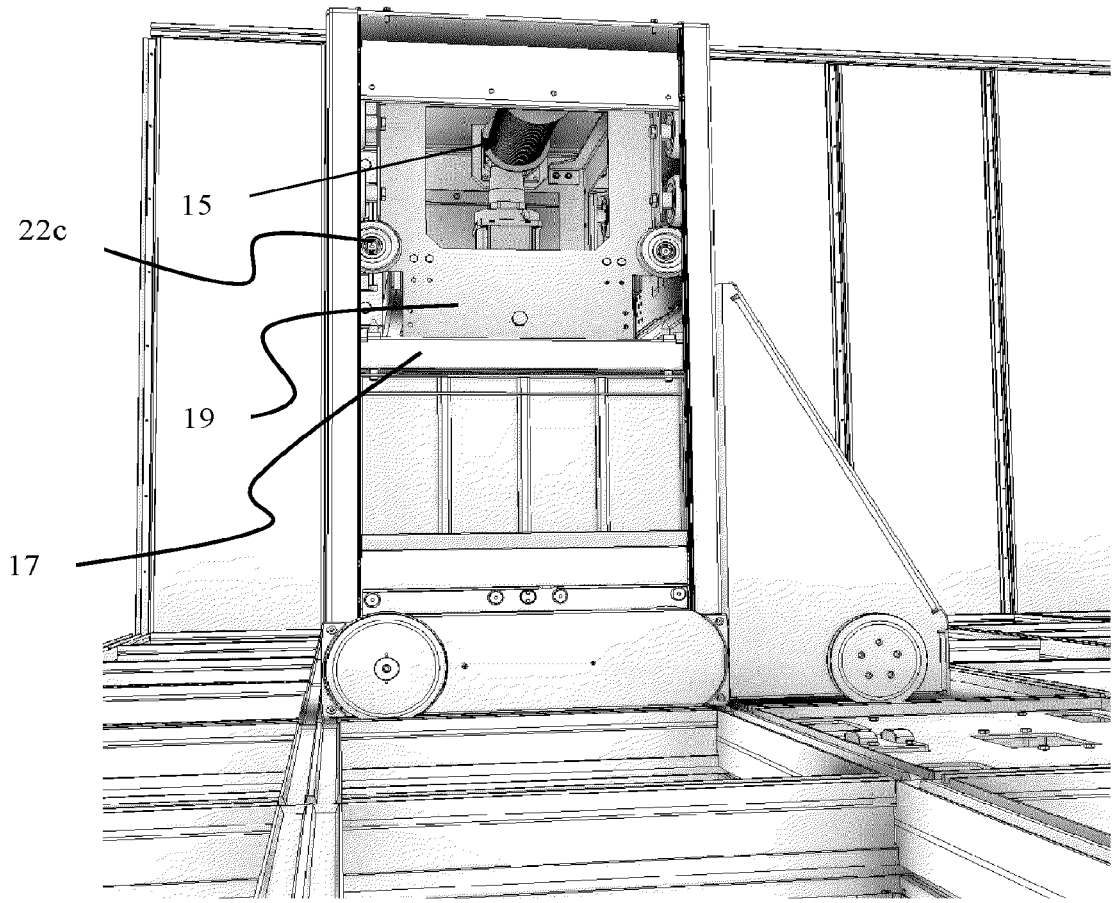

A second exemplary embodiment of a storage system 1 is shown in FIGS. 19-21. In this embodiment, the storage system features a single storage grid 104 arranged on a mezzanine 80 and connected via two extended grid columns 112' to a picking/stocking station 109 arranged below the mezzanine. Two exemplary embodiments of a container lift vehicle 2 are arranged at the top rail grid 108, details of the container lift vehicles are shown in FIGS. 22 and 23. To transfer a storage container between the storage grid 104 and the picking/stocking station 109, the storage container is lifted or lowered via the extended grid columns 112' (or transfer columns 119/120). A lower opening of the extended grid columns is arranged such that the guide shuttle 19 is within the grid column when the storage container is at a required level within the picking/stocking station and the lifting frame part 17 and storage container are consequently prevented from tilting during the transfer.

The container lift vehicle 2' in FIGS. 19-23 have most of its features in common with the container lift vehicle 2 in FIGS. 8-12, and the common features have the same reference numbers. The main difference is that the container lift vehicle in FIGS. 19-23 have a single set of wheels and are thus only able to move in a single direction upon the top rail grid. This provides for a simpler vehicle construction at the cost of a somewhat less flexible lift system. Further, the container lift vehicle 2' features a single lifting wire 15 for connecting the lifting frame part 17 and the lifting shaft instead of two lifting bands 16 as disclosed above.

Figure 24:
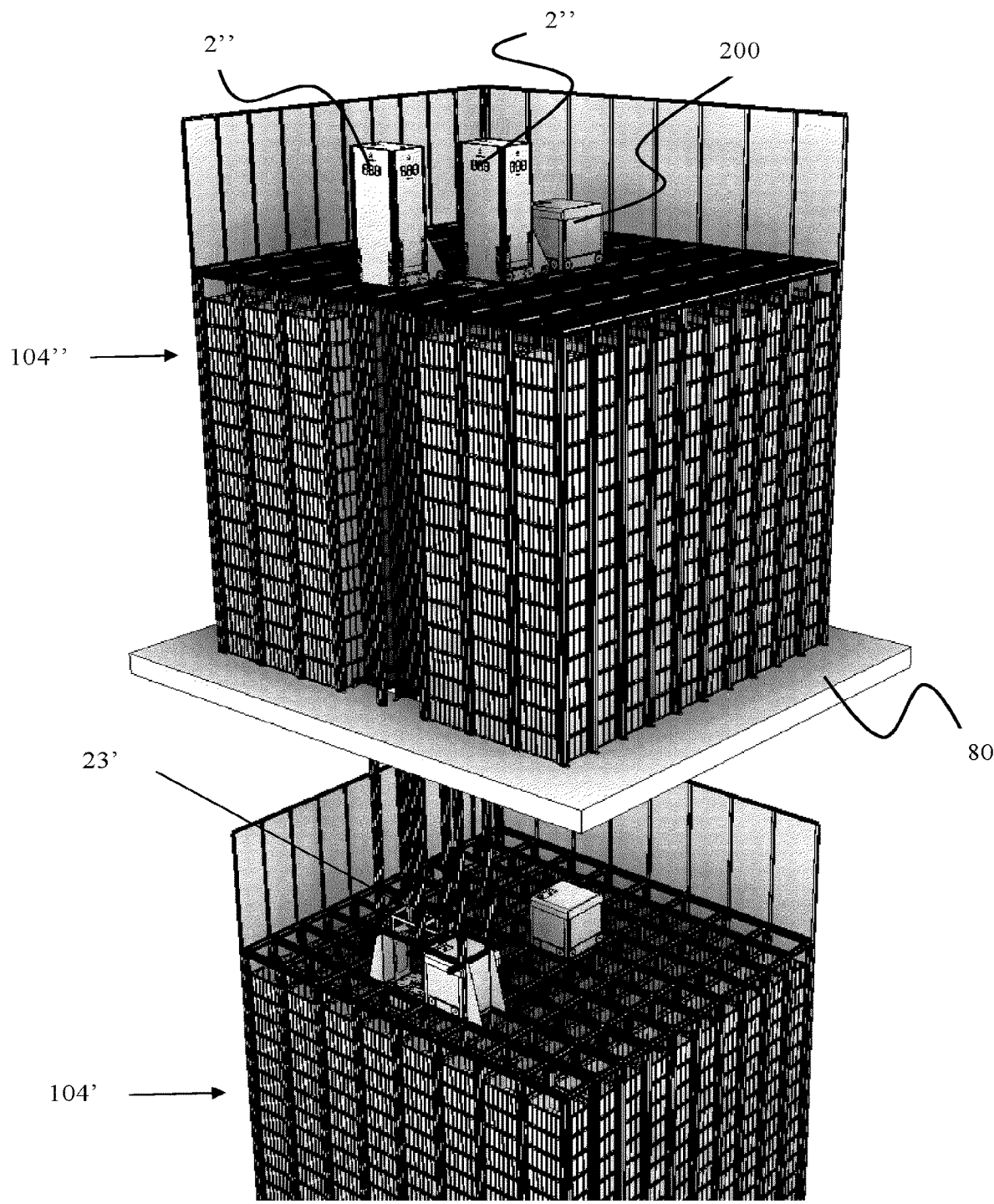
FIG. 24 is a perspective view of a third exemplary storage system according to the invention.
Figure 26:
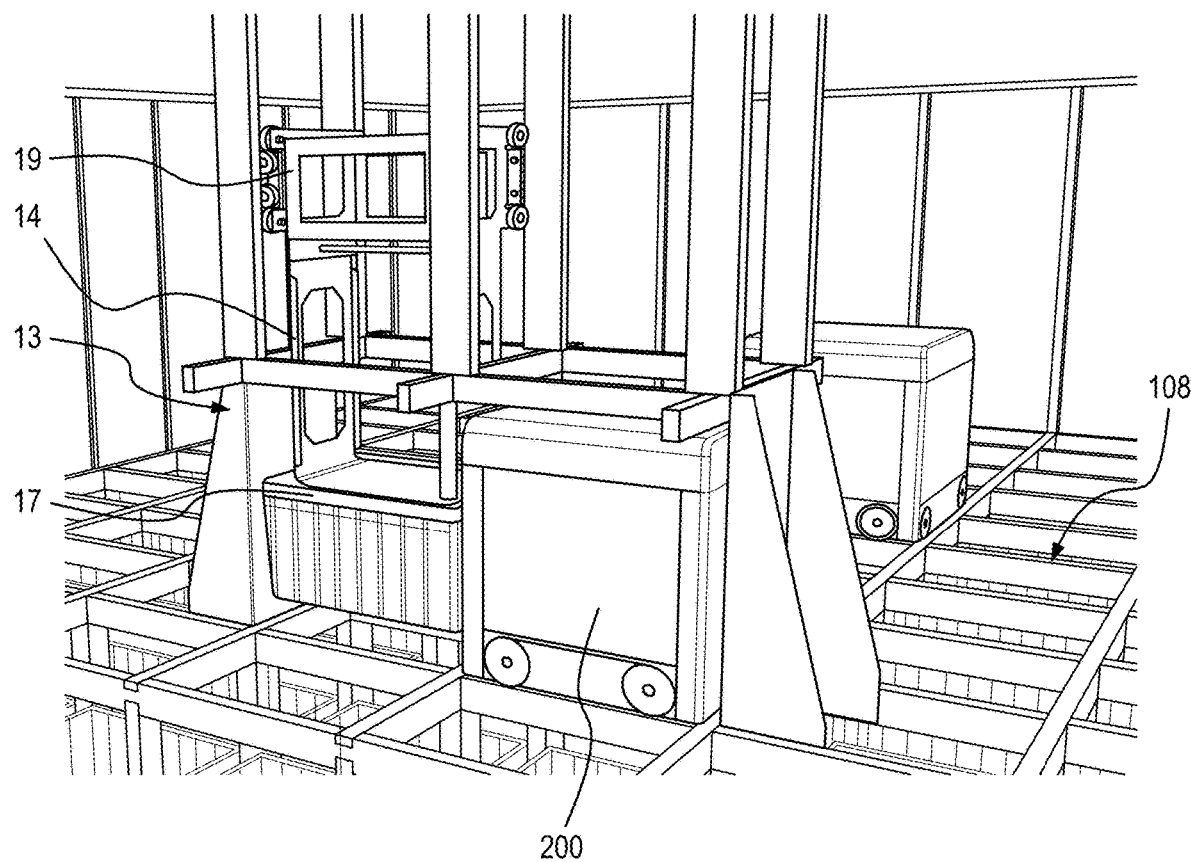
FIG. 26 is a perspective view of an exemplary container guiding assembly arranged between the two storage grids in FIG. 24.

A third exemplary embodiment of a storage system 1 is shown in FIG. 24. The storage system is similar to the storage system shown in FIG. 7 and features two vertically separated storage grids 104',104", a container handling vehicle 200 arranged on the top rail grid 108 of each storage grid, and a container lift vehicle 2" arranged on the top rail grid 108 of the upper storage grid 104". The upper storage grid is arranged on a mezzanine 80. The mezzanine may also represent a second floor of a building in which the storage system is arranged. In the third exemplary embodiment, the container lift vehicle 2" has most of its features in common with the container lift vehicle in FIGS. 19-23. However, to allow an alternative transfer of storage containers between the two storage grids, the container lift vehicle 2" features an extension frame 14 arranged between the lifting frame part 17 and the guide shuttle 19, see FIGS. 25A-25C. The extension frame 14 allows for a simplified container guiding assembly 23' to allow transfer of storage containers 106 between the upper and lower storage grid. The container guiding assembly 23' features a support frame 13 arranged at the top rail grid 108 of the lower storage grid 104' to support the lower ends of two grid columns 112 extending from the bottom of the upper storage grid. Grid columns extending from the bottom of a storage grid may also be termed guide columns. The extension frame 14 may advantageously be higher than the container handling vehicles 200 of the storage system as this allows for a height between the lower end of the extended grid column and the top rail grid of the lower storage grid which allows the container handling vehicle access to a storage container delivered to the lower storage grid by the container lift vehicle, see FIG. 26.

Figure 27:
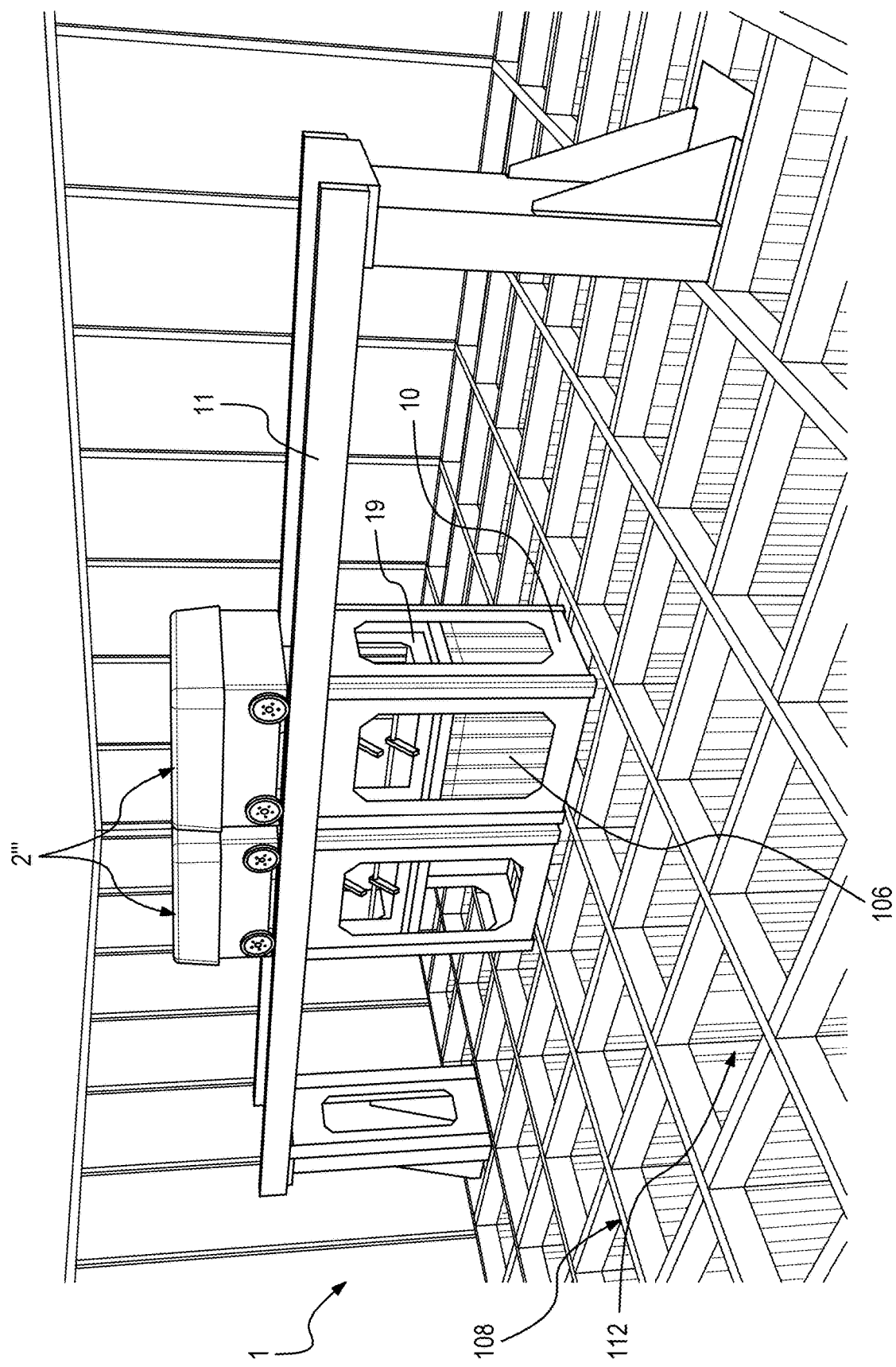
FIG. 27 is a perspective view of a fourth exemplary storage system according to the invention.
Figure 28:
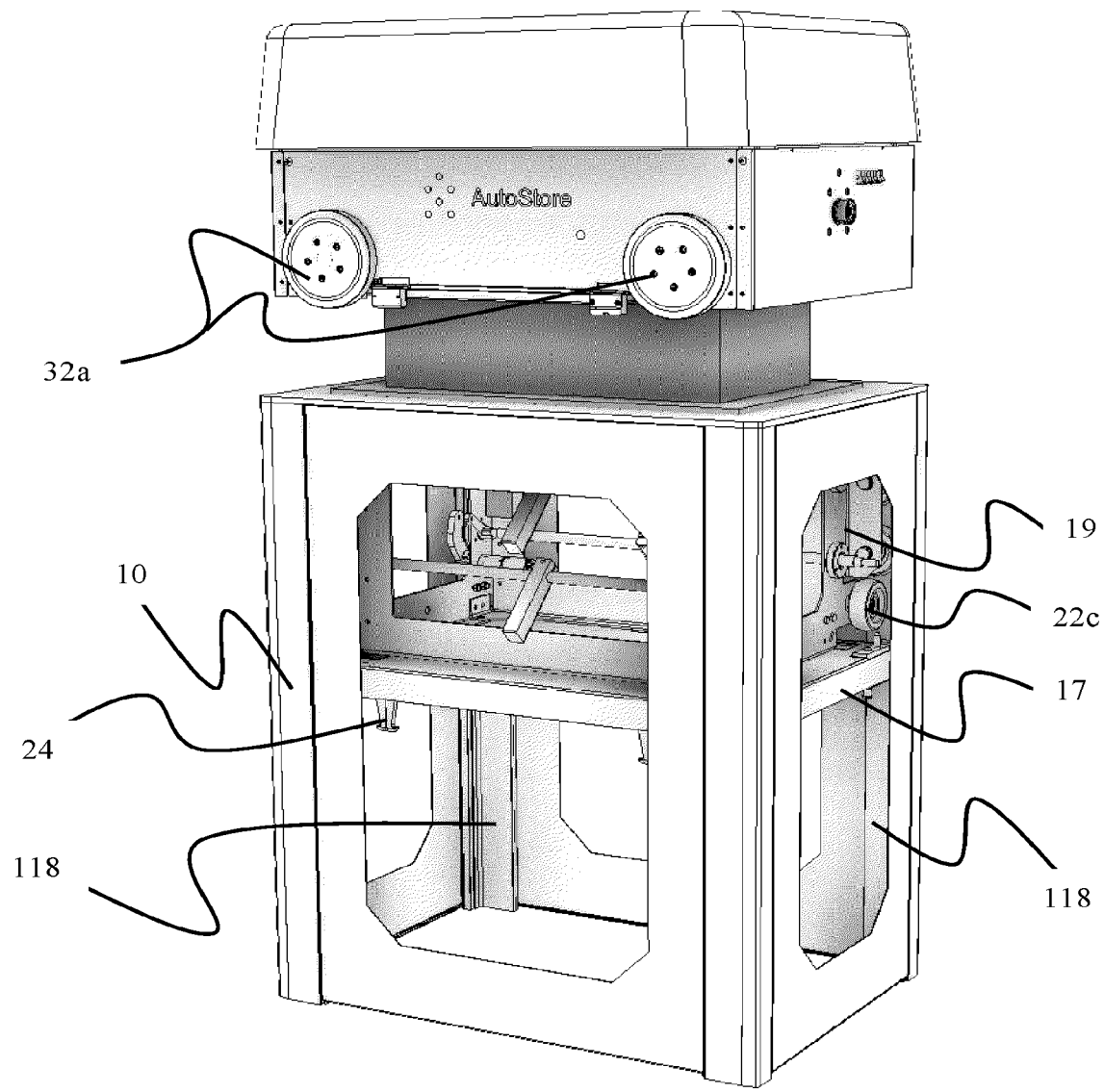
FIG. 28 is a detailed perspective view of an exemplary container lift of the storage system in FIG. 27.

A fourth exemplary embodiment of a storage system 1 is shown in FIG. 27. The storage grid 104 have the same features as discussed above. The fourth storage system is mainly differentiated from the storage systems above in that the container lift 2''' is not arranged to move on the top rail grid 108 but features a gantry 11 along which the container lift may move laterally above the top rail grid 108. Details of the container lift is shown in FIG. 28. To restrict horizontal tilting of the lifting assembly (i.e. the lifting frame part 17 and the guide shuttle 19) when raised above a grid column, the container lift comprises a framework 10 having internal guide surfaces 118 arranged to interact with the guide elements 22c of the guide shuttle 19. The internal guide surfaces 118 will prevent a storage container lifted by the lifting assembly from tilting, and possibly becoming stuck within the grid column, when the guide shuttle is no longer in contact with the grid column, i.e. is lifted above the top rail grid 108.

The following paragraphs are intended to demonstrate that certain features may be included together with other features in one or more embodiments of the disclosed invention. These are merely meant to be explicit examples of combinations of features and not an exhaustive list.

In one or more embodiments, a storage system comprises at least one storage grid (104) and a container lift (2), the storage grid comprises vertical column profiles (102) defining a plurality of grid columns (112), the grid columns comprise storage columns (105), in which storage containers (106) can be stored one on top of another in vertical stacks (107), and at least one transfer column (119,120), each of the grid columns being defined by four vertically extending column profiles (102), and the column profiles are interconnected at their upper ends by top rails (110,111) forming a horizontal top rail grid (108) of the storage grid, wherein the container lift comprises a lifting assembly (17,19) which is suspended from one or more spoolable lifting elements (16) and arranged to be raised or lowered in order to raise or lower an accompanying storage container (106) within the storage grid (104), wherein the lifting assembly comprises a lifting frame part (17) for releasable attachment to an upper section of a storage container (106) and a guide shuttle (19) arranged to guide the lifting frame part (17) and any accompanying storage container (106) as the lifting frame part (17) is raised and lowered within the storage grid (104), the guide shuttle is arranged above the lifting frame part and comprises guide elements which are each arranged to interact with one of the four column profiles (102) of a grid column (112) to stabilise and maintain horizontal alignment of the lifting frame part (17) and any accompanying storage container (106) during the raising and/or lowering of the lifting frame part; and a framework (10) featuring internal guide surfaces (118) arranged to interact with the guide elements (22a-d, 12) of the guide shuttle (19) when the guide shuttle is at a level above the top rail grid, such that the horizontal alignment of the lifting frame part (17) is stabilised and maintained.

In a storage system according to any embodiment, the guide elements may comprise sliding devices (12), roller assemblies (22a-d) or any combination thereof. In a storage system according to any embodiment, the guide shuttle (19) may be arranged above the lifting frame part (17). In a storage system according to any embodiment, each column profile (102) of a grid column (112) may comprise two vertical guide surfaces (116) forming an inside corner (117) of the grid column, and each guide element is arranged to interact with at least one of the vertical guide surfaces of a corresponding inner corner of a grid column in which the lifting assembly (17,19) is moved. In a storage system according to any embodiment, at least one of the guide elements may comprise a roller assembly (22a,22b,22c,22d) having at least one rotatable circumference arranged to interact with a corresponding vertical guide surface (116) of a grid column in which the lifting assembly (17,19) is moved. In a storage system according to any embodiment, the roller assembly (22a,22b,22c,22d) may comprise at least one rotatable circumference arranged to interact with the vertical guide surfaces of a corresponding inside corner of a grid column in which the lifting frame is moved.

In a storage system according to any embodiment, the guide shuttle (19) may comprise four vertically extended corner sections (21), wherein at least one guide element (22a-d, 12) is arranged at each corner section. In a storage system according to any embodiment, the container lift may be a container lift vehicle (2) comprising a vehicle body (3), into which a storage container may be lifted by the lifting assembly (17,19), and at least one set of wheels (32a,32b) for moving the container lift vehicle in a horizontal direction on the top rail grid (108). In a storage system according to any embodiment, the vehicle body (3) may comprise a framework featuring internal guide surfaces (118) arranged to interact with the guide elements (22a-d, 12) of the guide shuttle (19) when the lifting assembly is arranged inside the vehicle body (3), such that the horizontal alignment of the lifting frame part (17) is stabilised and maintained. In a storage system according to any embodiment, the internal guide surfaces (118) may be arranged in vertical planes corresponding to the vertical guide surfaces (116) of a grid column (112) from which a storage container (106) is lifted. In a storage system according to any embodiment, the container lift (2) may comprise a gantry (11) extending over at least a section of the top rail grid (108).

In one or more embodiments, a container lift vehicle (2) for a storage system (1) in accordance with any above-described embodiment comprises a vehicle body (3) comprising internal vertical guide surfaces (118); at least one set of wheels (32a,32b) for moving the container lift vehicle in a horizontal direction on a top rail grid (108); and a lifting device (18) arranged to lift a storage container (106) from a grid column (112) and into the vehicle body (3), wherein the lifting device (18) comprises a lifting assembly, comprising a lifting frame part (17) and a guide shuttle (19), at least one spoolable lifting element (16) and at least one lifting shaft (20), wherein the spoolable lifting element (16) connects the lifting shaft (20) and the lifting assembly (17,19), such that the lifting assembly may move in a vertical direction by rotation of the lifting shaft (20), the lifting frame part (17) is for releasable connection to a storage container (106), and the guide shuttle (19) is arranged above the lifting frame part (17) and comprises guide elements arranged to interact with the internal vertical guide surfaces (118), such that the horizontal alignment of the lifting frame part (17) is stabilised and maintained.

In a container lift vehicle according to any embodiment, the guide shuttle (19) may comprise four vertically extended corner sections (21) and at least one of the guide elements (22*a-d*, 12) arranged at each corner section, wherein the guide elements are arranged to interact with internal vertical guide surfaces (118) of the vehicle body (3), such that the guide shuttle (19) and the lifting frame part (17) are restricted from tilting relative a horizontal plane when the guide shuttle is inside the vehicle body. In a container lift vehicle according to any embodiment, the guide elements may comprise sliding devices (12), roller assemblies (22*a-d*) or any combination thereof. In a container lift vehicle according to any embodiment, the roller assemblies (22*a*, 22*b*,22*c*,22*d*) and the sliding devices (12) may comprise at least one rotatable circumference or sliding surface, respectively, arranged to interact with a corresponding internal vertical guide surface (118) of the vehicle body (3).

In one or more embodiments, a method of transferring a storage container in a storage system according to any above-described embodiment may comprise the steps of: moving the container lift (2) to a position above a storage column (105) in which the storage container is arranged; lowering the lifting assembly to releasably connect the lifting frame part (17) to an upper section of the storage container; raising the lifting assembly and the storage container to a level above the top rail grid (108); moving the container lift to a position above a transfer column (119, 120); and lowering the lifting assembly via the transfer column (119,120) while stabilizing the horizontal alignment of the lifting frame part (17) by interacting the guide elements with the four column profiles (102) of the transfer column (119,120).

REFERENCE NUMERALS

1 Storage system
2 Container lift vehicle
3 Vehicle body
8 Motor (for lifting shaft)
9 Spools (for lifting bands)
10 Framework
11 Gantry
12 Sliding block, sliding element, sliding device
13 Support frame
14 Extension frame
15 Lifting wire
16 Lifting band
17 Lifting frame, lifting frame part
18 Lifting device
19 Guide shuttle
20 Lifting shaft
21 Corner section (of guide shuttle)
22 Guide wheels
23 Container guiding assembly
24 Container connecting elements
25 Cavity (for accommodating a storage container)
26 Vertically moveable guiding profiles
27 Recess (in vertically moveable guiding profiles)
28 Inter-grid guiding elements
29 Counter-weight
30 Guiding pin
31 Pulley
32*a*,32*b* Wheel arrangement
38 Actuating mechanism (for inter-grid guiding elements)
50 Storage container lift
51 Vertical guide members
52 Guide track
53 Storage container shuttle
54 Support arm
55 Vertical guide frame
56 Guide wheels (on vertical guide frame)
80 Mezzanine
100 Framework structure
102 Upright members of framework structure, i.e. vertical column profiles
103 Horizontal members of framework structure
104 Storage grid
105 Storage column
106 Storage container
107 Stack
108 Top rail grid, rail system
109 Picking/stocking station
110 First set of parallel rails in first direction (X), top rails
111 Second set of parallel rails in second direction (Y), top rails
112 Grid column
115 Grid opening
116 Vertical guide surface
117 Inside corner of a grid column
118 Internal guide surfaces (of the container lift vehicle)
119 Transfer column,
120 Transfer column
122 Grid cell
200 Prior art container handling vehicle
201,301 Wheel arrangement
300 Prior art container handling vehicle
X First direction
Y Second direction
Z Third direction

What is claimed is:

1. A container lift for a container storage and retrieval system, comprising:
    a lifting assembly which is suspended from one or more lifting elements and arranged to be raised or lowered in order to raise or lower an accompanying storage container within the storage and retrieval system,
    wherein the lifting assembly comprises a lifting frame part for releasable attachment to a storage container and a guide shuttle arranged to guide the lifting frame part and any accompanying storage container as the lifting frame part is raised and lowered within the storage and retrieval system,
    the guide shuttle comprising guide elements which are each arranged to interact with a corresponding guide surface of the storage and retrieval system to stabilise and maintain horizontal alignment of the lifting frame part and any accompanying storage container during the raising and lowering of the lifting frame part,
    wherein the guide elements comprise sliding devices, roller assemblies or any combination thereof.

2. A container lift according to claim 1, wherein the guide shuttle is arranged above the lifting frame part.

3. A container lift according to claim 1, wherein each guide element is arranged to interact with at least one guide surface of the storage and retrieval system.

4. A container lift according to claim 3, wherein at least one of the guide elements comprises a roller assembly having at least one rotatable circumference arranged to interact with a corresponding vertical guide surface of the storage and retrieval system.

5. A container lift according to claim 2, wherein the roller assembly comprises at least one rotatable circumference arranged to interact with the corresponding vertical guide surface of the storage and retrieval system.

6. A container lift for a container storage and retrieval system, comprising:
- a lifting assembly which is suspended from one or more lifting elements and arranged to be raised or lowered in order to raise or lower an accompanying storage container within the storage and retrieval system,
- wherein the lifting assembly comprises a lifting frame part for releasable attachment to a storage container and a guide shuttle arranged to guide the lifting frame part and any accompanying storage container as the lifting frame part is raised and lowered within the storage and retrieval system,
- the guide shuttle comprising guide elements which are each arranged to interact with a corresponding guide surface of the storage and retrieval system to stabilise and maintain horizontal alignment of the lifting frame part and any accompanying storage container during the raising and lowering of the lifting frame part, wherein the guide shuttle comprises four vertically extended corner sections, wherein at least one guide element is arranged at each corner section.

7. A container lift according to claim 6, wherein the container lift is a container lift vehicle comprising a vehicle body, into which a storage container may be lifted by the lifting assembly, and at least one set of wheels configured to move the container lift vehicle in a horizontal direction on a top rail grid of the storage and retrieval system.

8. A container lift according to claim 7, wherein the vehicle body comprises a framework featuring internal guide surfaces arranged to interact with the guide elements of the guide shuttle when the lifting assembly is arranged inside the vehicle body, such that the horizontal alignment of the lifting frame part is stabilised and maintained.

9. A container lift for a container storage and retrieval system, comprising:
- a lifting assembly which is suspended from one or more lifting elements and arranged to be raised or lowered in order to raise or lower an accompanying storage container within the storage and retrieval system,
- wherein the lifting assembly comprises a lifting frame part for releasable attachment to a storage container and a guide shuttle arranged to guide the lifting frame part and any accompanying storage container as the lifting frame part is raised and lowered within the storage and retrieval system,
- the guide shuttle comprising guide elements which are each arranged to interact with a corresponding guide surface of the storage and retrieval system to stabilise and maintain horizontal alignment of the lifting frame part and any accompanying storage container during the raising and lowering of the lifting frame part, wherein the guide surfaces comprise internal vertical surfaces of a grid column within the storage and retrieval system.

10. A container lift according to claim 9, wherein the container lift comprises a gantry extending over at least a section of a top rail grid of the storage and retrieval system.

11. A container lift according to claim 9, wherein the one or more lifting elements are spoolable lifting elements attached to at least one lifting shaft.

12. A method of transferring a storage container in a container storage and retrieval system, comprising:
- moving the container lift of claim 9 to a position above the storage column of the storage and retrieval system in which a storage container is arranged;
- lowering the lifting assembly of the container lift;
- releasably connecting the lifting frame part of the lifting assembly to the storage container; and
- raising the lifting assembly and the storage container,
- wherein guide elements of the guide shuttle interact with corresponding guide surfaces of the storage and retrieval system to stabilise and maintain horizontal alignment of the lifting frame part during the raising and lowering of the lifting frame part.

* * * * *